United States Patent
Ito

(10) Patent No.: US 8,810,847 B2
(45) Date of Patent: Aug. 19, 2014

(54) INFORMATION PROCESSING APPARATUS, INFORMATION PROCESSING METHOD, AND STORAGE MEDIUM STORING PROGRAM THEREOF

(75) Inventor: Yousuke Ito, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 743 days.

(21) Appl. No.: 12/958,918

(22) Filed: Dec. 2, 2010

(65) Prior Publication Data

US 2011/0134485 A1    Jun. 9, 2011

(30) Foreign Application Priority Data

Dec. 8, 2009  (JP) ................................ 2009-278690

(51) Int. Cl.
*G06K 15/00* (2006.01)
*G06F 3/12* (2006.01)
*G06K 15/02* (2006.01)

(52) U.S. Cl.
CPC ........ *G06K 15/02* (2013.01); *G06K 2215/0082* (2013.01); *G06F 3/1208* (2013.01); *G06F 3/1285* (2013.01); *G06F 3/1243* (2013.01); *G06K 15/021* (2013.01)
USPC ........... 358/1.18; 358/1.1; 358/1.4; 358/1.13; 358/1.15; 358/3.26

(58) Field of Classification Search
None
See application file for complete search history.

(56) References Cited

U.S. PATENT DOCUMENTS

| | | | |
|---|---|---|---|
| 6,446,100 B1 * | 9/2002 | Warmus et al. | 715/246 |
| 7,196,813 B2 * | 3/2007 | Matsumoto | 358/1.3 |
| 7,869,069 B2 * | 1/2011 | Currans et al. | 358/1.15 |
| 7,891,294 B2 * | 2/2011 | Yamamoto | 101/450.1 |
| 7,916,313 B2 * | 3/2011 | Nishikawa | 358/1.1 |
| 8,228,540 B2 * | 7/2012 | Himpe | 358/1.15 |
| 2002/0063897 A1 * | 5/2002 | Matsumoto | 358/1.18 |
| 2003/0076535 A1 * | 4/2003 | Prosi | 358/1.16 |
| 2005/0134875 A1 * | 6/2005 | Currans et al. | 358/1.9 |
| 2006/0195454 A1 | 8/2006 | Davis | |
| 2007/0253027 A1 * | 11/2007 | Hiebert | 358/1.18 |
| 2008/0079976 A1 * | 4/2008 | van de Capelle et al. | 358/1.13 |
| 2008/0134917 A1 * | 6/2008 | Yamamoto | 101/450.1 |
| 2009/0033986 A1 * | 2/2009 | Himpe | 358/1.15 |
| 2010/0079798 A1 * | 4/2010 | Iguchi | 358/1.15 |
| 2010/0302592 A1 * | 12/2010 | Nishikawa | 358/1.16 |

FOREIGN PATENT DOCUMENTS

JP        2006-323813 A    11/2006

* cited by examiner

*Primary Examiner* — King Poon
*Assistant Examiner* — Vincent Peren
(74) *Attorney, Agent, or Firm* — Carter, DeLuca, Farrell & Schmidt, LLP

(57) ABSTRACT

If it is determined that a quality of a print product produced by printing a second variable drawing object, which is generated by combining a fixed drawing object and a first variable drawing object, by using a digital printing machine is within an allowable range, an information processing apparatus generates the second variable drawing object by combining the fixed drawing object and the first variable drawing object.

15 Claims, 21 Drawing Sheets

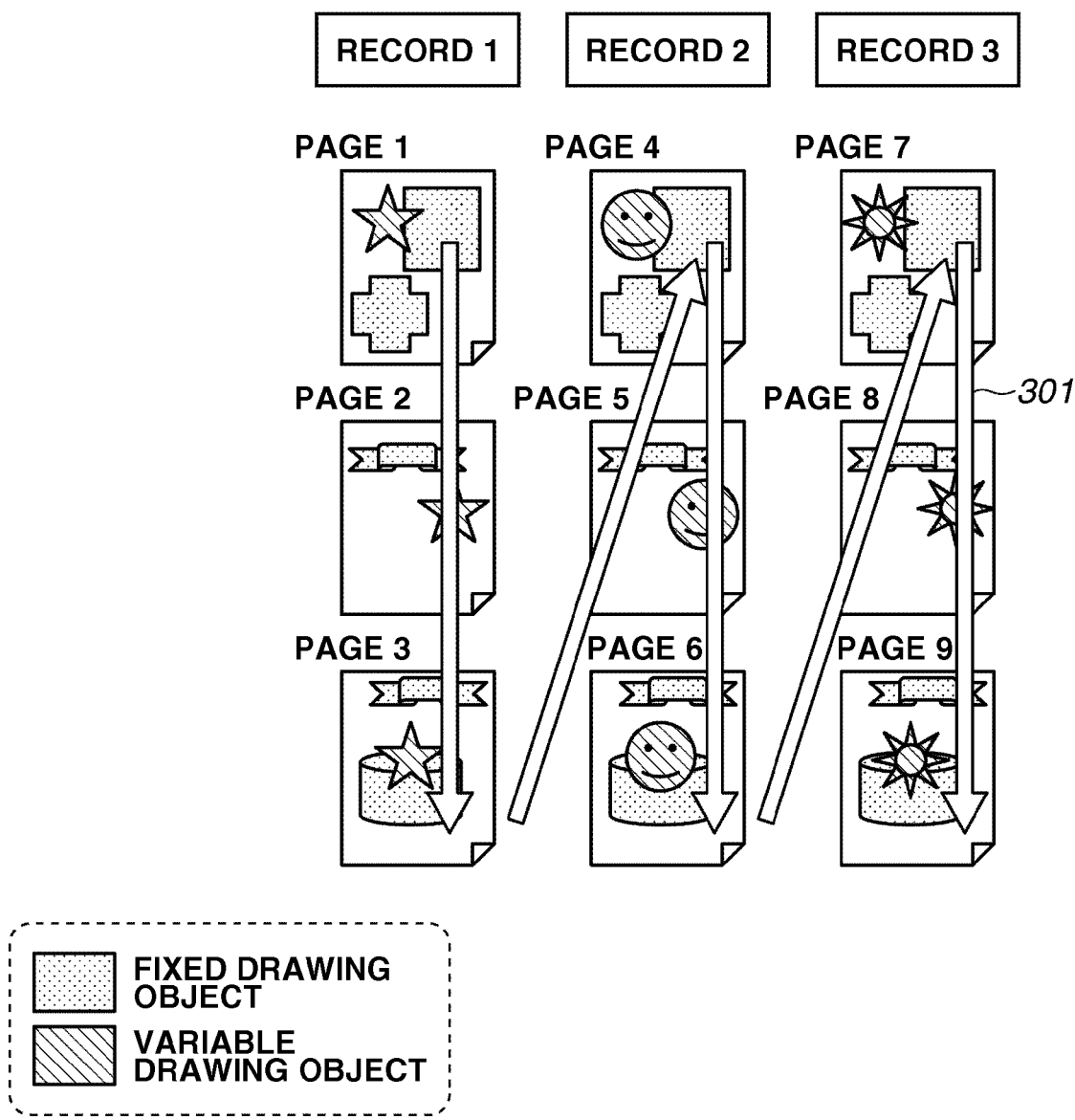

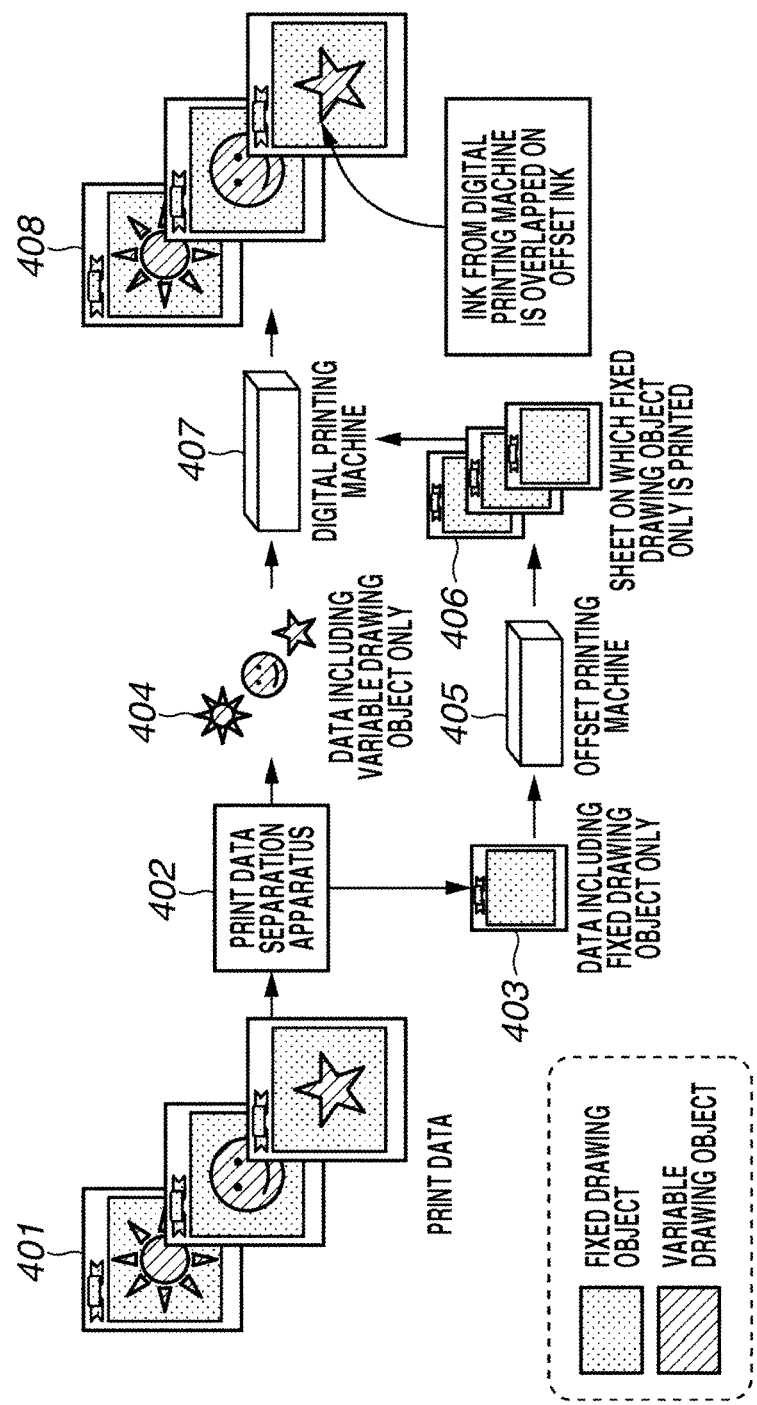

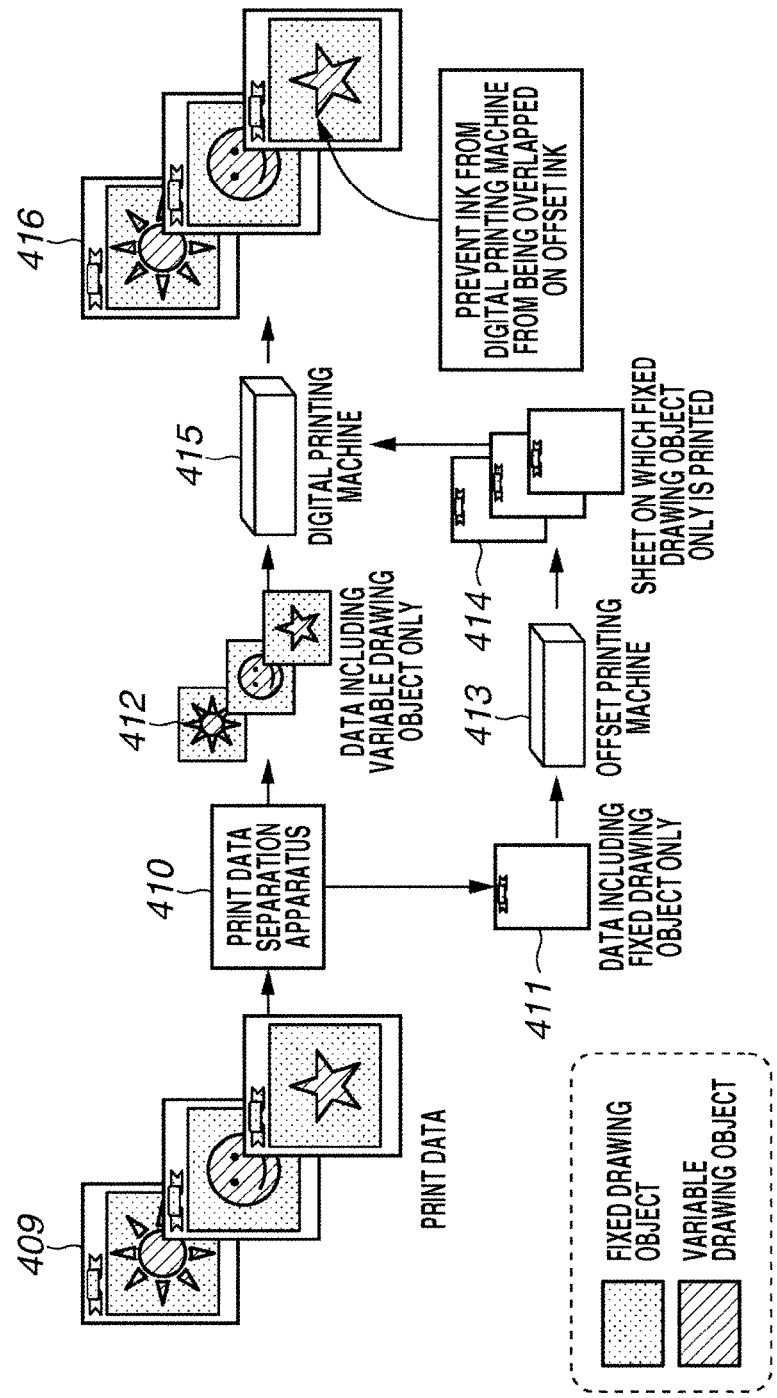

FIG.7A

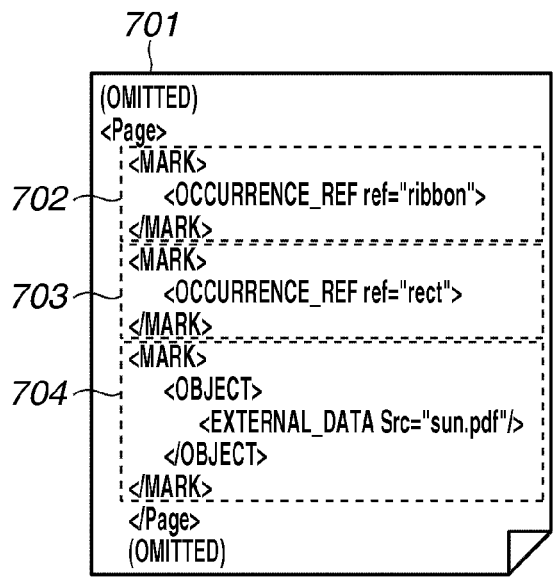

701
```
(OMITTED)
<Page>
    <MARK>
702     <OCCURRENCE_REF ref="ribbon">
    </MARK>
    <MARK>
703     <OCCURRENCE_REF ref="rect">
    </MARK>
    <MARK>
704     <OBJECT>
            <EXTERNAL_DATA Src="sun.pdf"/>
        </OBJECT>
    </MARK>
</Page>
(OMITTED)
```

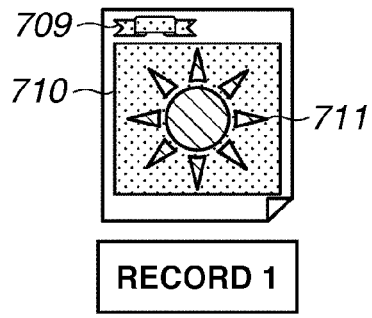

709, 710, 711

RECORD 1

FIG.7B

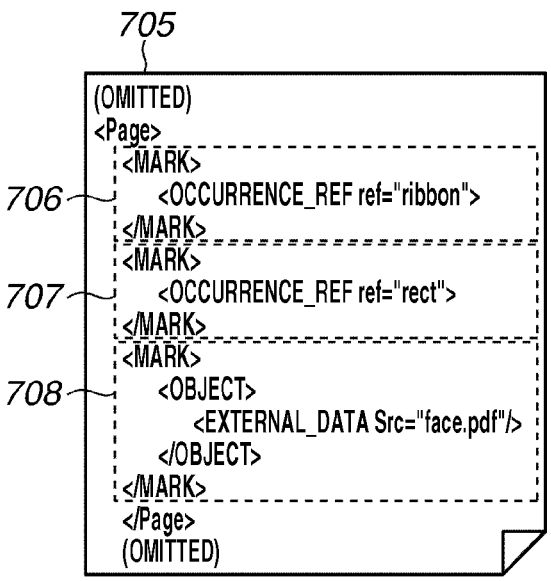

705
```
(OMITTED)
<Page>
    <MARK>
706     <OCCURRENCE_REF ref="ribbon">
    </MARK>
    <MARK>
707     <OCCURRENCE_REF ref="rect">
    </MARK>
    <MARK>
708     <OBJECT>
            <EXTERNAL_DATA Src="face.pdf"/>
        </OBJECT>
    </MARK>
</Page>
(OMITTED)
```

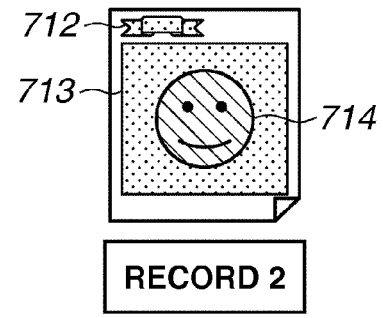

712, 713, 714

RECORD 2

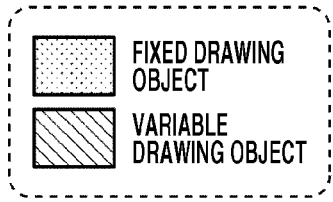

FIXED DRAWING OBJECT

VARIABLE DRAWING OBJECT

FIG.11

$$\text{Eval}(V, F) = \frac{1}{\text{Num\_record}} \sum_{k=1}^{\text{Num\_record}} \frac{\text{NonOverlappedArea}(V_k, F)}{\text{Area}(V_k)}$$

$\left[ \begin{array}{l} V_k\text{: VARIABLE DRAWING OBJECTS OVERLAPPED ON PROCESSING TARGET} \\ \quad\text{FIXED DRAWING OBJECT OF k-TH RECORD} \\ F\text{: PROCESSING TARGET FIXED DRAWING OBJECT} \\ \text{Area}(V_k)\text{: TOTAL AREA OF VARIABLE DRAWING OBJECTS OVERLAPPED} \\ \quad\quad\quad\text{ON PROCESSING TARGET FIXED DRAWING OBJECT OF k-TH RECORD} \end{array} \right]$

FIG.14

Eval(F) = ColorDensity(F)

$$\begin{bmatrix} \text{F: PROCESSING TARGET FIXED DRAWING OBJECT} \\ \text{ColorDensity(F): AVERAGE COLOR DENSITY OF PROCESSING TARGET} \\ \text{FIXED DRAWING OBJECTS} \end{bmatrix}$$

INFORMATION PROCESSING APPARATUS, INFORMATION PROCESSING METHOD, AND STORAGE MEDIUM STORING PROGRAM THEREOF

BACKGROUND OF THE INVENTION

1. Field of the Invention

The present invention relates to an information processing apparatus, an information processing method, and a storage medium storing a program of the information processing method.

2. Description of the Related Art

In recent years, the processing speed and the image quality of an electrophotographic type printing apparatus and an inkjet printing method have been improved. Under such a circumstance, a print on demand (POD) market has expanded. In the POD market, digital printing based on electronic data is executed by making the most of a digital image forming apparatus, such as a digital copying machine or a digital multifunction peripheral (MFP). By using a digital image forming apparatus, which implements plateless printing, a job of a relatively small lot can be printed with low costs and in a short delivery time.

In the POD market, in which electronic data is used as its characteristic, variable data printing (VDP) is used as a print method. In a VDP document, which is used in the VDP, a fixed portion and a variable portion are separated from each other. In addition, data of the variable portion is supplied from a data source, such as a relational database (RDB) or a comma separated value (CSV) file. If a column (field) of the data source is associated with a variable portion of a template document and if the field associated with the variable portion of the template document is applied to each row (record) of the data source, print jobs having slightly mutually different contents can be executed.

On the other hand, in the field of commercial printing, an offset printing machine is predominantly used in executing jobs of a middle or a large lot. If an offset printing machine, which can generally output a print product with a high image quality compared to that output by a digital printing machine, is used, it is necessary to use a printing plate. Therefore, if the VDP is executed as in digital printing, it becomes necessary to prepare a large number of printing plates. In this case, the costs may become very high. Accordingly, this is not practical.

In recent years, offset printing-supplementary printing is used as a print method that can implement meritorious effects of an offset printing machine and a digital printing machine at the same time. In offset printing-supplementary printing, fixed objects of each record are printed on a sheet by using an offset printing machine and then variable objects of each record are digitally printed by using a digital printing machine (an inkjet type printing apparatus or an electrophotographic type printing apparatus). In the above-described manner, high-quality printing by offset printing and the VDP by digital printing can be implemented at the same time. An "object" herein refers to an image, a graphic, or a text.

In the offset printing-supplementary printing, the following problems may arise if an ink from a digital printing machine (in the following description, the "ink from a digital printing machine" may include a toner used by an electrophotographic type printing apparatus), which is provided to print a variable drawing object, is overlapped on an offset ink, which is provided to print a fixed drawing object.

Firstly, in the above-described case, a print product may not be printed in a color desired by a user. More specifically, a user recognizes a color of a spectrum of light reflected on a printing sheet after being incident to an ink used in the digital printing machine. Accordingly, the color that the user can recognize may be affected by a color of the offset ink on the sheet.

Therefore, the color that can be recognized by the user may be different from the color designated by the user on the premise that the job is printed on a blank (white) sheet. This is because the color of the offset ink, which has been previously provided on the printing sheet, and the ink from the digital printing machine, which is overlapped on the offset ink, are mixed together.

If the above-described problem is to be solved by color management that uses a color profile, it is necessary to generate a color profile for an effective combination of the offset ink and the ink from the digital printing machine. In order to implement the solution by color management, it is necessary to execute colorimetry processing for the number of times equivalent to the total number of colors of the colors reproduced by the offset ink and those reproduced by the ink from the digital printing machine. This may require the user to execute very complicated operations. Accordingly, this is not practical.

Secondly, if an electrophotographic printing apparatus is used as the digital printing machine, a toner image may be blurred or damaged due to possible defective toner transfer or fixation. If the offset printing-supplementary printing is executed, an image formation process using the toner from the digital printing machine is executed in a state in which the conductivity of a recording paper has been changed by the offset ink. Therefore, defective toner transfer or fixation may occur to cause damage or blur to a toner image.

Japanese Patent Application Laid-Open No. 2006-323813 discusses a method for unfilling a part of a fixed drawing object if the fixed drawing object is overlapped on a variable drawing object. However, if the above-described conventional method is used, the image quality may degrade if a drawing region of the variable drawing object changes record by record. In other words, it is necessary to unfill a part of a fixed drawing object in a region including a drawing region so that any drawing region of the variable drawing object may not be overlapped on the fixed drawing object.

SUMMARY OF THE INVENTION

The present invention is directed to a method for preventing an ink from a digital printing machine, which is used in printing a variable drawing object, from being overlapped on an offset ink, which is used in printing a fixed drawing object, while preventing otherwise possible degradation of image quality at the same time.

According to an aspect of the present invention, an information processing apparatus includes a determination unit configured to, if a first variable drawing object, which is included in print data including a processing target fixed drawing object, overlaps the processing target fixed drawing object, determine whether a quality of a print product produced by printing a second variable drawing object, which is generated by combining the fixed drawing object and the first variable drawing object, by using a digital printing machine is within an allowable range when compared with a quality of a print product achieved when the fixed drawing object is printed by an offset printing machine, and an object generation unit configured to, if it is determined by the determination unit that the quality of the print product produced by printing the second variable drawing object by using the digital printing machine is within the allowable range, generate the second variable drawing object by combining the fixed drawing object and the first variable drawing object.

According to another aspect of the present invention, an information processing apparatus includes a determination unit configured to, if a first variable drawing object, which is included in print data including a processing target fixed drawing object, overlaps the processing target fixed drawing object, determine whether a quality of a print product produced by printing a second variable drawing object, which is generated by combining the fixed drawing object and the first variable drawing object, by using a digital printing machine is within an allowable range when compared with a quality of a print product achieved when the fixed drawing object is printed by an offset printing machine, an object generation unit configured to, if it is determined by the determination unit that the quality of the print product produced by printing the second variable drawing object by using the digital printing machine is within the allowable range, generate the second variable drawing object by combining the fixed drawing object and the first variable drawing object, and an addition unit configured to, if the second variable drawing object has been generated by the object generation unit, add data indicating that the second variable drawing object has been already generated to the print data.

According to yet another aspect of the present invention, an information processing apparatus includes a determination unit configured to, if a first variable drawing object, which is included in print data including a processing target fixed drawing object, overlaps the processing target fixed drawing object, determine whether a quality of a print product produced by printing a second variable drawing object, which is generated by combining the fixed drawing object and the first variable drawing object, by using a digital printing machine is within an allowable range when compared with a quality of a print product achieved when the fixed drawing object is printed by an offset printing machine, and an association unit configured to, if it is determined by the determination unit that the quality of the print product produced by printing the second variable drawing object by using the digital printing machine is within the allowable range, associate the fixed drawing object with data for generating the second variable drawing object by combining the fixed drawing object and the first variable drawing object.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the present invention.

FIGS. 3A and 3B illustrate an order of data before and after sorting.

FIGS. 4A and 4B illustrate an exemplary flow of offset printing-supplementary printing.

FIGS. 7A and 7B illustrate an example of processing for identifying a type of an object (a variable drawing object or a fixed drawing object).

FIG. 11 illustrates an example of an evaluation function used for evaluating the degree of overlap between a fixed drawing object and a variable drawing object.

FIG. 14 illustrates an example of an evaluation function used for evaluating a density of a fixed drawing object.

DESCRIPTION OF THE EMBODIMENTS

Various exemplary embodiments, features, and aspects of the invention will be described in detail below with reference to the drawings.

Figure 1:
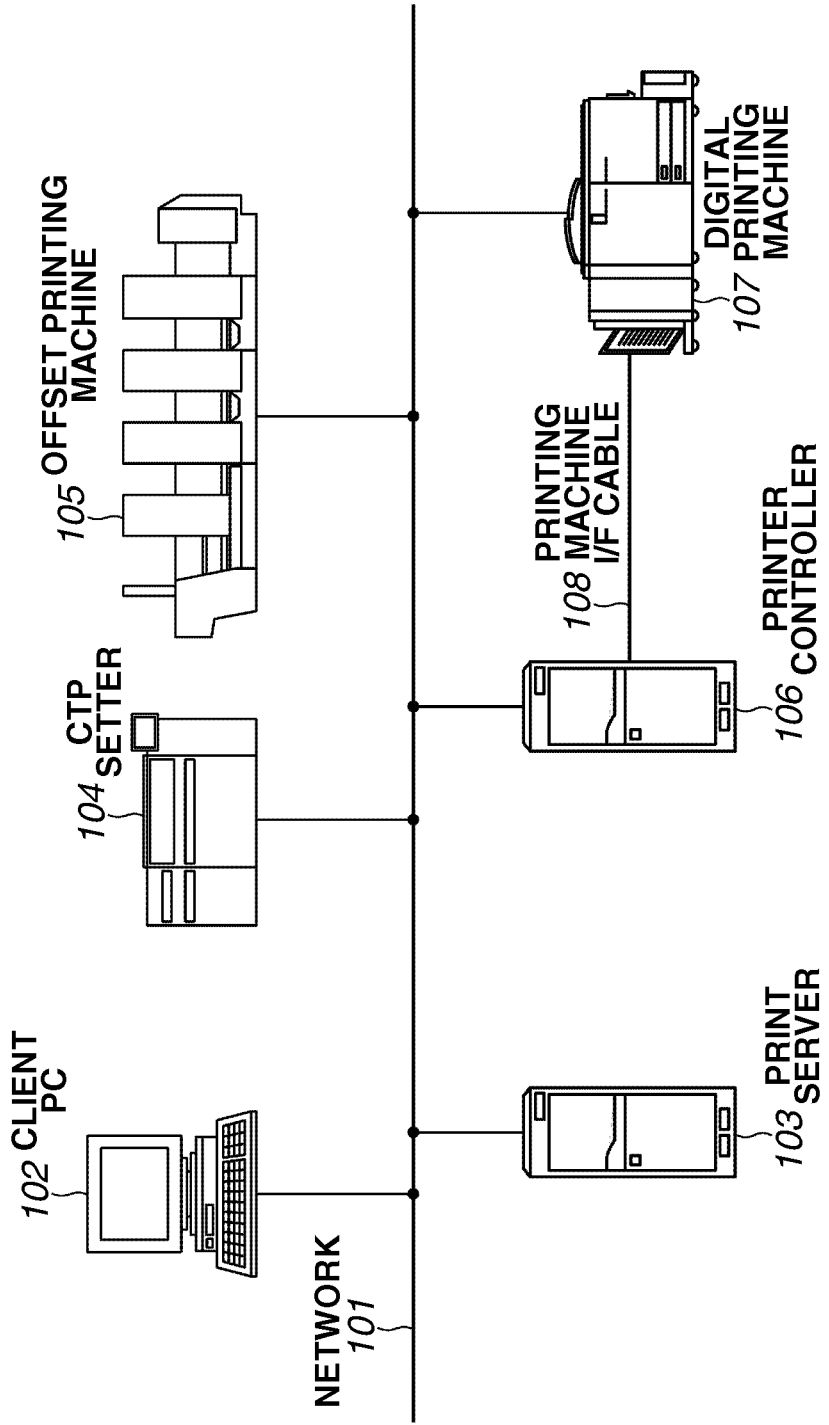
FIG. 1 illustrates an exemplary system configuration of an offset printing-supplementary printing system according to an exemplary embodiment of the present invention.

FIG. 1 illustrates an exemplary system configuration of an offset printing-supplementary printing system according to a first exemplary embodiment of the present invention. Referring to FIG. 1, the offset printing-supplementary printing system includes a client PC 102, a print server 103, a computer to plate (CTP) setter 104, an offset printing machine 105, a digital printing machine 107, and a printer controller 106, which is connected to the digital printing machine 107. The above-described apparatuses and machines are in communication with one another via a network 101. Furthermore, the digital printing machine 107 and the printer controller 106 are in communication with each other via a printing machine interface (I/F) cable 108.

The client PC 102 transmits print data to the print server 103. The print server 103 separates the received print data into print data to be printed by the offset printing machine 105 (hereinafter simply referred to as "offset printing print data") and print data to be printed by the digital printing machine 107 (hereinafter simply referred to as "digital printing print data"). The print server 103 executes raster image processor (RIP) on the offset printing print data. Furthermore, the print server 103 transmits the bitmap data, which is a result of the RIP, to the CTP setter 104.

The CTP setter 104 outputs a printing plate from the received bitmap data. An operator sets the printing plate on the offset printing machine 105 and gives a print instruction to execute printing. Then, a sheet having an image printed thereon by offset printing is output. After the printing is completed, the offset printing machine 105 notifies the print server 103 that the printing has been completed.

Then, the printed sheet is set in a paper feed stage of the digital printing machine 107. More specifically, the operator sets the printed sheet by hand. Alternatively, the sheet can be set in the following manner. More specifically, in this case, after the print server 103 has received a print completion notification from the offset printing machine 105, the printed sheet is conveyed by a belt conveyer, which is used for automatically conveying the printed sheet according to an instruction input by the print server 103.

After receiving the print completion notification from the offset printing machine 105, the print server 103 transmits digital printing print data to the printer controller 106. The printer controller 106 executes RIP on the received print data. Furthermore, the printer controller 106 transmits a result of the RIP (bitmap data) to the digital printing machine 107 via the printing machine I/F cable 108 to print the data. By executing the above-described operation, an image, which is formed by digital printing, is formed on the printed sheet printed by offset printing and the offset printing-supplementary printing is completed.

In the present exemplary embodiment, it is supposed that the client PC 102, the print server 103, and the printer controller 106 are separately provided apparatuses connected to one another via the network 101. However, the present exemplary embodiment is not limited to this. More specifically, effects of the present exemplary embodiment can be achieved if the client PC 102, the print server 103, and the printer controller 106 are implemented on the same computer.

Figure 2A:
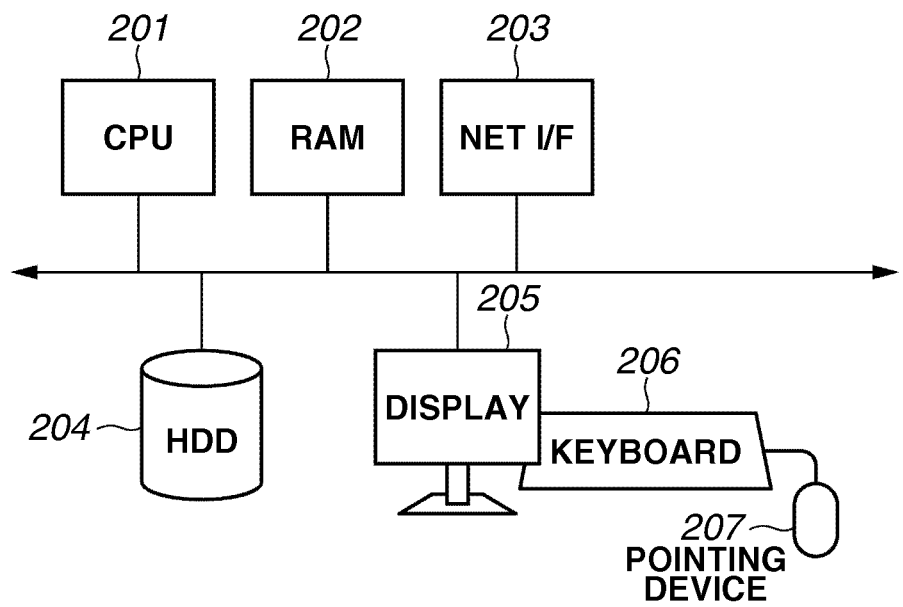
FIGS. 2A and 2B illustrate an exemplary hardware configuration of a client personal computer (PC) and a printer controller.

Now, the client PC 102 will be described in detail below with reference to FIG. 2A. FIG. 2A illustrates an exemplary hardware configuration of the client PC 102. The hardware configuration of the client PC 102 described below with reference to FIG. 2A is a mere example. More specifically, for the hardware configuration of the client PC 102, various other general configurations, which include various buses and interfaces, can also be used to implement the function of the present exemplary embodiment.

Referring to FIG. 2A, a CPU 201 controls the entire operation of the client PC 102 according to a control program loaded on a random access memory (RAM) 202. The RAM 202 is a built-in storage unit on which a control program of the client PC 102, which is executed by the CPU 201, and various data, such as data of a document and image data, are loaded.

A network I/F 203 is an interface with a network, such as the Internet, via which data communication is executed under control of the CPU 201. A hard disk drive (HDD) 204 stores control software of the client PC 102 and various data. A display 205 displays information. A keyboard 206 is an input device for inputting information according to a user operation. A pointing device 207, such as a mouse, can be operated by a user to select and input information.

Various types of software (programs) stored on the HDD 204 is loaded and executed on the RAM 202 under control of the CPU 201 where necessary by using a function of an operating system (OS) loaded on the RAM 202, where necessary. The configuration of the print server 103 is similar to that of the client PC 102.

Figure 2B:
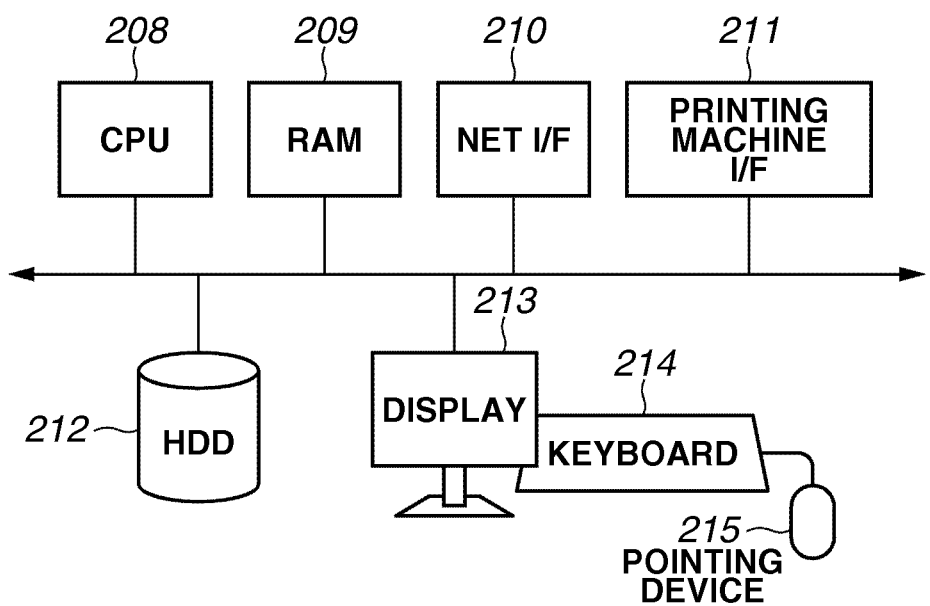

Now, an exemplary hardware configuration of the printer controller 106 will be described in detail below with reference to FIG. 2B. FIG. 2B illustrates an exemplary hardware configuration of the printer controller 106. Similar to the client PC 102, for the hardware configuration of the printer controller 106 described below with reference to FIG. 2B is a mere example. More specifically, various other general configurations, which include various buses and interfaces, can also be used as the configuration of the printer controller 106 to implement the function of the present exemplary embodiment.

Referring to FIG. 2B, a CPU 208 controls the entire operation of the printer controller 106 according to a control program loaded on a RAM 209. The RAM 209 is a built-in storage unit on which a control program of the printer controller 106, which is executed by the CPU 208, and various data, such as data of a document and image data, are loaded.

A network I/F 210 is an interface with a network, such as the Internet, via which data communication is executed under control of the CPU 208. An HDD 212 stores control software of the printer controller 106 and various data. A display 213 displays information. A keyboard 214 is an input device for inputting information according to a user operation. A pointing device 215, such as a mouse, can be operated by a user to select and input information.

A printing machine I/F 211 is connected with the digital printing machine 107 via the printing machine I/F cable 108. The printing machine I/F 211 is used for transmitting RIP-processed data. Various types of software (programs) stored on the HDD 212 are loaded and executed on the RAM 209 under control of the CPU 208 where necessary by using a function of an OS loaded on the RAM 209, where necessary.

Print data to be printed by the offset printing-supplementary printing includes background data and foreground data. In the present exemplary embodiment, the background data is printed by the offset printing machine 105. The foreground data is printed by the digital printing machine 107.

In data generated for VDP, it is supposed that a fixed object (a fixed drawing object) of each record has been generated and included as the background data and that a variable object (a variable drawing object) of each record has been generated and included as the foreground data. However, the background data and the foreground data can also be described and generated as data for mutually different layers of portable document format (PDF). In the following description, an object described in a layer of the background data is referred to as a "fixed drawing object" while an object described on a layer of the foreground data is referred to as a "variable drawing object" for easier understanding. In addition, the background data and the foreground data can be previously generated as mutually different page description language (PDL) files.

Figure 3B:
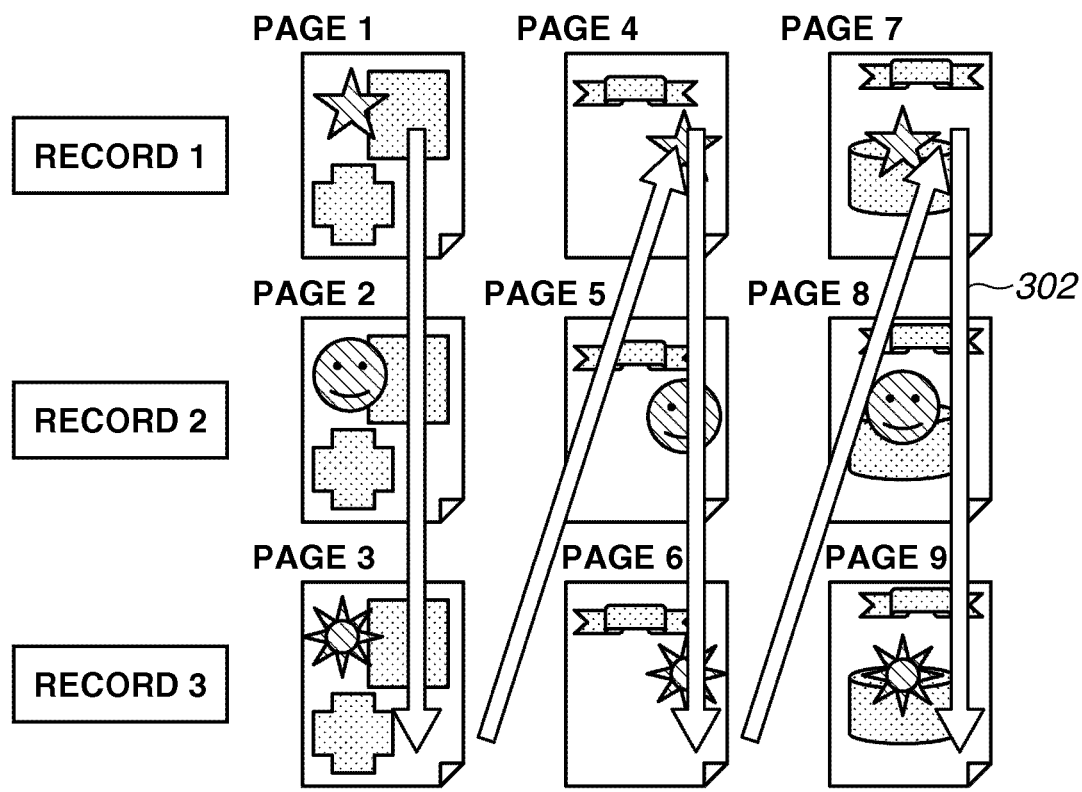

Now, a page order precondition for input print data will be described in detail with reference to FIGS. 3A and 3B. In print data used in offset printing-supplementary printing, which is generated by the client PC 102, data of each record is arranged in ascending order from the first page as illustrated in FIG. 3A. The print data used in offset printing-supplementary printing, which is generated by the client PC 102, can be previously sorted so that the same background data (fixed drawing objects) is serially arranged as illustrated in FIG. 3B.

In the example illustrated in FIG. 3A, pages of the data are arranged according to a page order 301. In the example illustrated in FIG. 3B, pages of the data are arranged according to a page order 302.

In executing the offset printing-supplementary printing, at first, a fixed drawing object is printed by using the offset printing machine 105. Accordingly, it is necessary, before the print server 103 transmits the RIP result (i.e., the RIP-processed offset printing print data) to the CTP setter 104, that the pages has been sorted so that the same background data (fixed drawing objects) is serially arranged as illustrated in FIG. 3B. In the present exemplary embodiment, "offset printing print data" refers to print data including fixed drawing objects only. Furthermore, in the present exemplary embodiment, the "RIP result" refers to bitmap data.

An algorithm for sorting the data is not essential to the characteristics of the present exemplary embodiment. Accordingly, in the present exemplary embodiment, it is supposed that the data has been previously sorted as illustrated in FIG. 3B before executing the processing for separating the background data from the foreground data. In other words, it is supposed that the print data used in the offset printing-supplementary printing, which is generated by the client PC 102, has been previously sorted as illustrated in FIG. 3B.

Now, a problem to be solved by the present exemplary embodiment will be briefly described and characteristics of the present exemplary embodiment will be described in detail with reference to FIGS. 4A and 4B.

FIG. 4A illustrates an exemplary flow of offset printing-supplementary printing. More specifically, the example illustrated in FIG. 4A illustrates an operation by which an ink from the digital printing machine 107 is overlapped on the offset ink. In the present exemplary embodiment, the "ink from the digital printing machine 107" includes the toner of the digital printing machine 107 if the digital printing machine 107 uses toners.

Referring to FIG. 4A, print data 401 is separated by the print data separation apparatus 402 into data 403, which includes a fixed drawing object only, and data 404, which includes a variable drawing object only. The data 403, which includes a fixed drawing object only, is printed by offset printing by an offset printing machine 405. After offset-printing the data 403, a sheet 406, which has the fixed drawing object printed thereon only, is output.

Then, the sheet 406, which has the fixed drawing object printed thereon only, is stacked into a paper feed stage of a digital printing machine 407. Then, the data 404, which includes a variable drawing object only, is printed by the digital printing machine 407 on the sheet 406.

As described above, if a variable drawing object is overlapped on a fixed drawing object, the ink from the digital printing machine is laid on the offset ink in an overlapping manner as indicated by a print result 408. Therefore, the above-described problem may arise.

In order to address the above-described problem, the present exemplary embodiment separates objects from one another so that a variable drawing object is not overlapped on a fixed drawing object as illustrated in FIG. 4B. To paraphrase this, when print data 409 is input, the print data separation apparatus 410 detects an overlap region, if any, of overlap between a fixed drawing object and a variable drawing object. If any overlap between the fixed drawing object and the variable drawing object is detected, then the print data separation apparatus 410 merges (combines) the fixed drawing object and the variable drawing object. The print data separation apparatus 410 handles the merged object as one variable drawing object.

In the example illustrated in FIG. 4B, data 412 includes a merged variable drawing object only. Data 411 includes a fixed drawing object only. The data 411 is printed by an offset printing machine 413. Furthermore, data including a variable drawing object only is printed, by a digital printing machine 415, on a sheet 414 on which the data 411 including the fixed drawing object only has been printed.

Accordingly, on a print result 416, the ink from the digital printing machine is not overlapped on the offset ink. Therefore, the present exemplary embodiment can effectively prevent the above-described problem. In the present exemplary embodiment, the print server 103 (FIG. 1) executes the merging.

Figure 5:
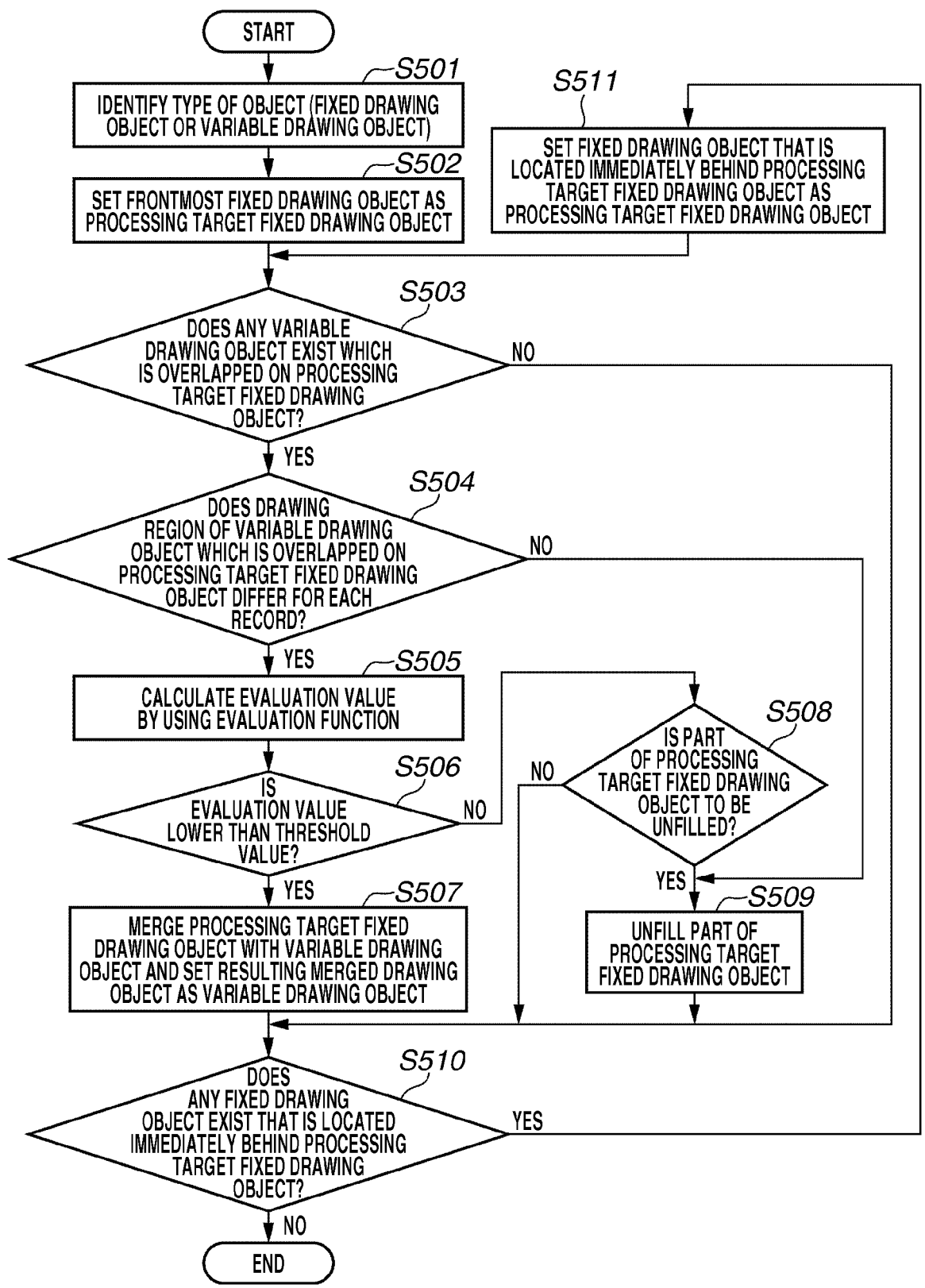
FIG. 5 illustrates an exemplary flow of the entire processing according to an exemplary embodiment of the present invention.

FIG. 5 is a flow chart illustrating an example of processing for separating input print data into a variable drawing object and a fixed drawing object. Processing illustrated in FIG. 5 is implemented by the CPU 201 of the print server 103 by loading and executing a program from the HDD 204. However, in the following description, it is assumed that the print server 103 executes the processing for easier understanding.

Referring to FIG. 5, in step S501, the print server 103 reads print data and identifies a variable drawing object and a fixed drawing object. The processing for identifying the variable drawing object and the fixed drawing object will be described in detail later below with reference to FIG. 8.

In step S502, as initialization of subsequent loop processing, the print server 103 executes the following loop processing by using a frontmost fixed drawing object as a processing target fixed drawing object. More specifically, in the present exemplary embodiment, a "frontmost object" refers to an object, of fixed drawing objects included in data of a specific one page, which is written as the last object. This is because in general print data, an object to be described subsequently to an object to be described first is drawn on the object to be described first. In addition, the above-described initialization is necessary in order to prevent possible adverse change of order of describing fixed drawing objects, which may arise due to merging. The merging, which is executed in step S507 (FIG. 5), will be described in detail below.

In step S503, the print server 103 determines whether any variable drawing object overlapping the processing target fixed drawing object exists. If it is determined that any variable drawing object overlapping the processing target fixed drawing object exists (YES in step S503), then the processing advances to step S504. On the other hand, if it is determined that no variable drawing object overlapping the processing target fixed drawing object exists (NO in step S503), then the processing advances to step S510. The above-described determination in step S503 will be described in more detail later below with reference to FIG. 9.

In step S504, the print server 103 determines whether a drawing region of the variable drawing object overlapping the processing target fixed drawing object differs record by record. If it is determined that a drawing region of the variable drawing object overlapping the processing target fixed drawing object is not different record by record (NO in step S504), then the processing advances to step S509.

In step S509, the print server 103 unfills a part of the fixed drawing object. A reason for executing unfilling of the fixed drawing object if it is determined that a drawing region of the variable drawing object overlapping the processing target fixed drawing object is not different record by record will be described below with reference to FIGS. 6A and 6B.

Figure 6A:
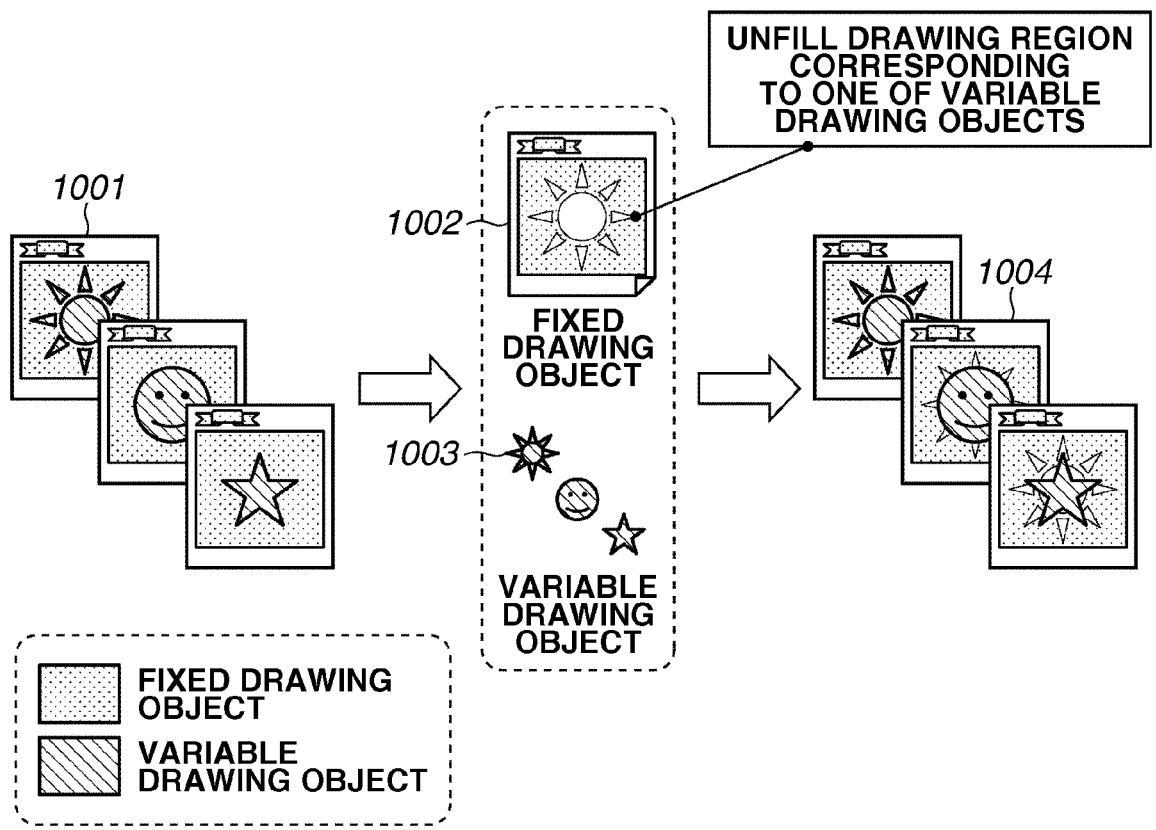
FIGS. 6A and 6B illustrate an example of a print result that changes or does not change after unfilling.

FIG. 6A illustrates a case where a drawing region of the variable drawing object overlapping the processing target fixed drawing object is "different" record by record.

In the example illustrated in FIG. 6A, even if a part of a fixed drawing object 1002 is unfilled so that the fixed drawing object 1002 is not overlapped with any one of variable drawing objects 1003, the drawing region of the variable drawing object becomes different record by record. Therefore, the drawing region of the variable drawing object not used for the unfilling does not have a shape similar to the shape of the unfilling region, as illustrated with a print result 1004. Accordingly, the content to be drawn may become different before and after a part of the fixed drawing object is unfilled.

Figure 6B:
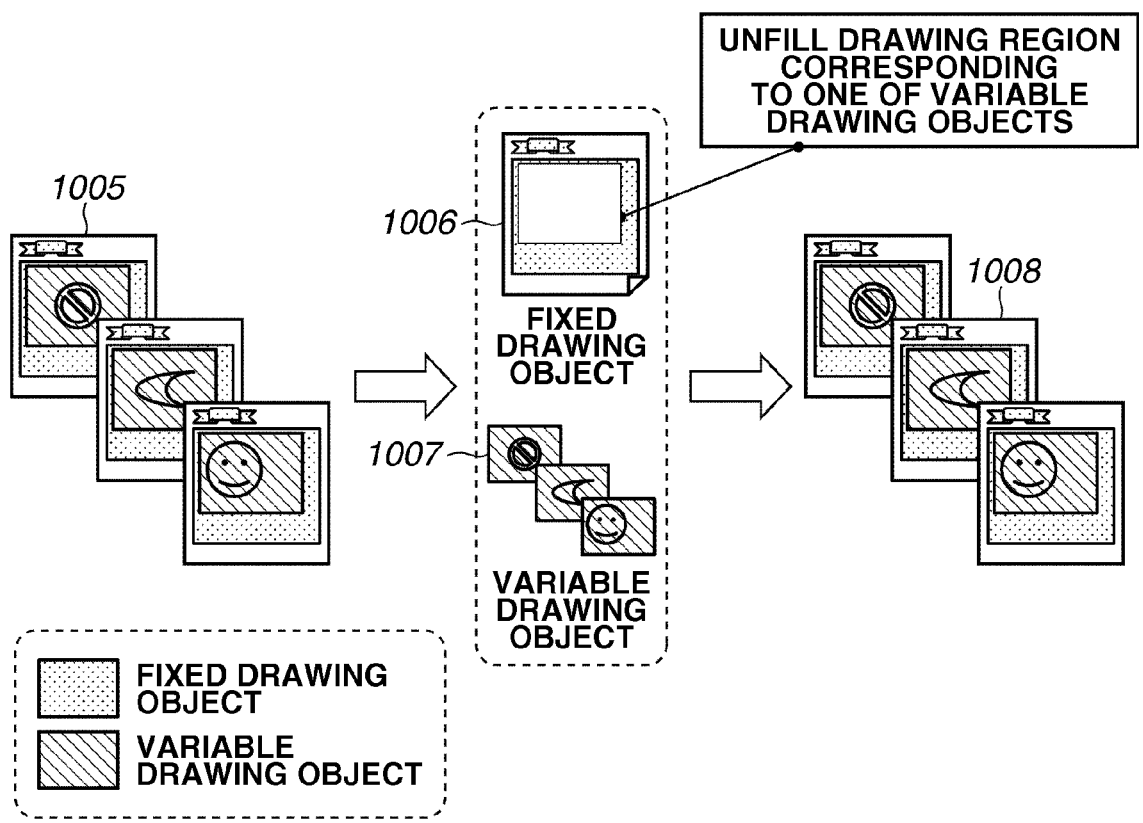

FIG. 6B schematically illustrates a case where the drawing region of the variable drawing object overlapping the processing target fixed drawing object is "not different" record by record. Referring to FIG. 6B, print data 1005 is print data of the case where the drawing region of the variable drawing object overlapping the processing target fixed drawing object is "not different" record by record.

In the example illustrated in FIG. 6B, if a part of a fixed drawing object 1006 is unfilled so that the fixed drawing object 1006 is not overlapped on any one of variable drawing objects 1007, the drawing region of the variable drawing object does not become different record by record. Therefore, as illustrated with a print result 1008, the shape of other variable drawing objects is identical to the shape of the unfilled region. Accordingly, the content to be drawn does not become different after the unfilling.

In the present exemplary embodiment, the print server 103 executes the unfilling if the drawing region of the variable drawing object overlapping the processing target fixed drawing object does not become different record by record due to the above-described reason.

In step S505, the print server 103 calculates an evaluation by using a predetermined evaluation function. More specifically, the calculation in step S505 is executed to evaluate whether to merge the processing target fixed drawing object and the variable drawing object overlapping the processing target fixed drawing object. The evaluation function used in the present exemplary embodiment will be described in detail below with reference to FIG. 11.

In the present exemplary embodiment, it is determined whether to merge the processing target fixed drawing object and the variable drawing object overlapping therewith in order to prevent ineffective offset printing-supplementary printing which may otherwise arise if the mutually overlapping variable drawing object and fixed drawing object are merged.

More specifically, if variable drawing objects and fixed drawing objects are overlapped with one another only by a small region thereof and if the size of each fixed drawing object is larger than the size of the variable drawing object, then all the fixed drawing objects are printed by the digital printing machine. In this case, the fixed drawing object, which should be printed by offset printing, is actually printed by the digital printing machine. Therefore, the quality of a resulting print product is not as high as the quality of a print product printed by offset printing. Therefore, it is necessary to determine whether to merge the objects by using the evaluation function.

In step S506, the print server 103 determines whether the evaluation value calculated in step S505 is equal to or less than a threshold value. If it is determined that the evaluation value calculated in step S505 is equal to or less than the threshold value (YES in step S506), then the processing advances to step S507 to merge the processing target fixed drawing object and the variable drawing objects overlapping therewith. On the other hand, if it is determined that the evaluation value calculated in step S505 is greater than the threshold value (NO in step S506), then the processing advances to step S508. The threshold value can be previously determined by a program. Alternatively, a user can arbitrarily set the threshold value. In this case, the print server 103 receives the user setting of the threshold value.

In step S507, the print server 103 merges the processing target fixed drawing object, which has been determined "to be merged" in step S506, with the variable drawing objects overlapping the processing target fixed drawing object (object generation processing). The object merged in step S507 is handled as one variable drawing object.

By executing the above-described processing, overlapping of the variable drawing object on the fixed drawing object can be prevented. Accordingly, overlapping of the ink from the digital printing machine on the offset ink can be prevented in the later stage of offset printing-supplementary printing.

In step S508, the print server 103 determines whether to unfill a part of the processing target fixed drawing object that has been determined "not to be merged" in step S506. For the determination in step S508, a user can input an instruction via a user interface for inputting whether to unfill a part of the fixed drawing object. In this case, the print server 103 receives the user instruction input via the user interface. Alternatively, whether to unfill a part of the fixed drawing object can be previously set in a setting file. The user interface that allows the user to whether to execute unfilling will be described in detail below with reference to FIG. 15.

If it is determined that a part of the fixed drawing object is to be unfilled (YES in step S508), then the processing advances to step S509. In step S509, the print server 103 unfills a part of the fixed drawing object. On the other hand, if it is determined that a part of the fixed drawing object is not to be unfilled (NO in step S508), then the processing advances to step S510. The processing in step S508 can be omitted. More specifically, if it is determined that the evaluation value is greater than the threshold value (NO in step S506), then the processing can directly advance to step S509.

In step S509, the print server 103 unfills a part of the processing target fixed drawing object. More specifically, in step S509, the print server 103 unfills a part of the processing target fixed drawing object in the shape of a circumscribed rectangle region of the variable drawing objects overlapping the processing target fixed drawing object.

As described above, in the present exemplary embodiment, the print server 103 unfills a part of the fixed drawing object in the shape of a circumscribed rectangle of the variable drawing object instead of unfilling a part of the fixed drawing object in the shape of the drawing region of the variable drawing object because of the following reasons. More specifically, because the drawing region of the variable drawing objects is variable, it is necessary to unfill a part of the fixed drawing object in the shape of the drawing region, which is common to the variable drawing objects.

If a part of the fixed drawing object is unfilled in the shape of the drawing region of a specific variable drawing object of the variable drawing objects, the unfilled region may not match the drawing region of all the other variable drawing objects. In this case, the resulting objects may not be output as desired by the user. On the other hand, if the processing has advanced from step S504 directly to step S509, the print server 103 unfills a part of the processing target fixed drawing object in the shape of the variable drawing object overlapping the processing target fixed drawing object.

In step S510, the print server 103 determines whether any other fixed drawing object exists immediately behind the processing target fixed drawing object. If it is determined that any other fixed drawing object exists immediately behind the processing target fixed drawing object (YES in step S510), then the processing advances to step S511. On the other hand, if it is determined that no other fixed drawing object exists immediately behind the processing target fixed drawing object (NO in step S510), then the processing illustrated in FIG. 5 ends. In step S511, the print server 103 recognizes the fixed drawing object existing immediately behind the processing target fixed drawing object as another processing target fixed drawing object.

By executing the above-described loop processing, the print server 103 merges the fixed drawing object and the variable drawing object or unfills a part of the fixed drawing object so that the variable drawing object is not overlapped on the fixed drawing object. In addition, the print server 103 finally outputs print data including the fixed drawing object only and print data including the variable drawing object only.

Now, the processing for identifying a variable drawing object and a fixed drawing object, which is executed in step S501 (FIG. 5), will be described in detail below with reference to FIGS. 7A and 7B and FIG. 8.

The content of the identification processing in step S501 is different according to the type of input print data. More specifically, suppose that print data has been generated and input, which includes background data (fixed drawing objects) and foreground data (variable drawing objects) on different layers. In this case, it is not necessary for the print server 103 to execute particular processing in step S501 because the fixed drawing object and the variable drawing object have been already identified.

Furthermore, suppose another case where background data and foreground data have been previously generated as mutually different PDL files. In this case also, it is not necessary for the print server 103 to execute particular processing in step S501 because the fixed drawing object and the variable drawing object have been already identified.

On the other hand, if data generated for VDP, such as personalized printing markup language (PPML), has been input, a fixed drawing object and a variable drawing object of the input data have not been identified from one another. Accordingly, in this case, it is necessary for the print server 103 to identify the variable drawing object and the fixed drawing object according to a flow chart illustrated in FIG. 8.

Now, the identification processing executed by the print server 103 in the above-described case will be described in detail below with reference to FIGS. 7A and 7B and FIG. 8. FIGS. 7A and 7B illustrate exemplary processing for identifying a variable drawing object and a fixed drawing object.

In print data described in PPML, background data is described as an object fixed for each record (fixed drawing object) while foreground data is described as an object variable for each record (variable drawing object). In addition, in the present exemplary embodiment, it is supposed that the object fixed for each record (fixed drawing object) is defined as a "reusable object".

FIG. 7A illustrates print data of a page of a first record. FIG. 7B illustrates print data of a page of a second record. In the examples illustrated in FIGS. 7A and 7B, descriptions 701 and 705 of PPML scripts are equivalent to pages of the first and the second records, respectively. The PPML scripts 701 and 705 are different from actually used scripts because the scripts 701 and 705 are illustrated in the drawing as having descriptions necessary for the present exemplary embodiment only for easier understanding.

In the example illustrated in FIG. 7A, objects 702 through 704 are described as the first through the third objects of the first record, respectively. Similarly, in the example illustrated in FIG. 7B, objects 706 through 708 are described as the first through the third objects of the second record, respectively.

In PPML, a reusable object is drawn by using an element "OCCURRENCE_REF". In the present exemplary embodiment, each of the objects 702, 703, 706, and 707 are equivalent to the reusable object. Each of the objects 704 and 708 is a variable drawing object. Each of objects 709 through 711 is a drawing result obtained when the objects 702 through 704 are drawn. Each of objects 712 through 714 is a drawing result obtained when the objects 706 through 708 are drawn.

Figure 8:
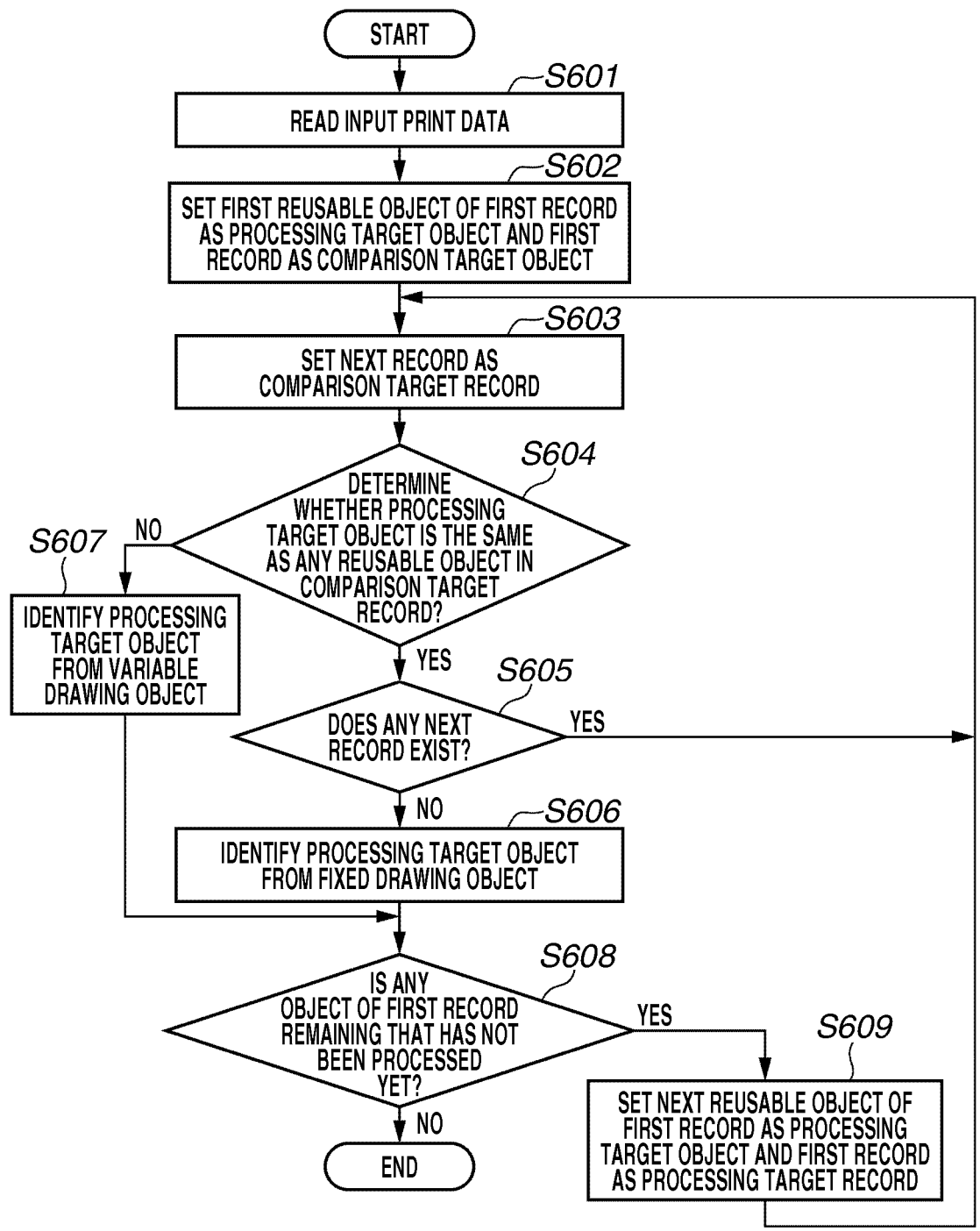
FIG. 8 is a flow chart illustrating an exemplary flow of processing for identifying a type of an object (a variable drawing object or a fixed drawing object).

Referring to FIG. 8, in step S601, the print server 103 reads the print data. In steps S602 and S603, the print server 103 executes initialization for subsequent loop processing. More specifically, in step S602, the print server 103 sets a first reusable object of the first record as a processing target object and sets the first record as a comparison target record.

In step S603, the print server 103 sets a next record as a comparison target record. In the example illustrated in FIG. 7A, the object 702 (the drawing result 709) is set as the processing target object. In addition, the second record illustrated in FIG. 7B is set as the comparison target record.

In step S604, the print server 103 determines whether the processing target object is the same as any reusable object in the comparison target record. The determination in step S604 as to whether the processing target object is the same as any reusable object can be made by determining whether a reference name of each reusable object is the same as that of the processing target object. Alternatively, the above-described determination can be made based on a result of comparison of the drawing content of a reference target object with the content of the processing target object.

In the examples illustrated in FIGS. 7A and 7B, the print server 103 determines whether the object 702 (709) is the same as any of the objects 706 (712), 707 (713), and 708 (714). In the example illustrated in FIG. 7B, for the object 706 (712), the reference name of the reusable object is the same as that of the object 702 (709). Accordingly, it is determined that the object 706 (712) is the same as the object 702 (709).

If it is determined that the processing target object is different from all the reusable objects (NO in step S604), then the processing advances to step S607. In step S607, the print server 103 identifies the processing target object as the variable drawing object.

On the other hand, if it is determined that the processing target object is the same as any reusable object in the comparison target record (YES in step S604), then the processing advances to step S605. In this case, the print server 103 executes the loop processing in steps S603 through S605 until it is determined in step S604 that the processing target object is the same as any reusable object in all the records. Then the processing advances to step S606. In step S606, the print server 103 identifies the processing target object as the fixed drawing object. The processing in steps S604 through S606 or S607 is repeated as loop processing for the number of times equivalent to the number of reusable objects included in the print data.

In step S608, the print server 103 determines whether to end the loop. In step S609, the print server 103 executes a next loop. More specifically, in step S609, the print server 103 sets a reusable object described immediately after the processing target reusable object, of the first record (FIG. 7A), as a processing target object. In addition, the print server 103 sets the first record as the processing target record. In the example illustrated in FIG. 7A, the object 703, which is described immediately after the object 702, is set as the processing target object.

By executing the above-described processing, the print server 103 identifies the fixed drawing object and the variable drawing object. In the present exemplary embodiment, the data is generated in PPML. However, the present exemplary embodiment is not limited to this. More specifically, the object can be identified by executing the similar processing if the data is generated in any format other than PPML, such as PDL for VDP.

Figure 9:
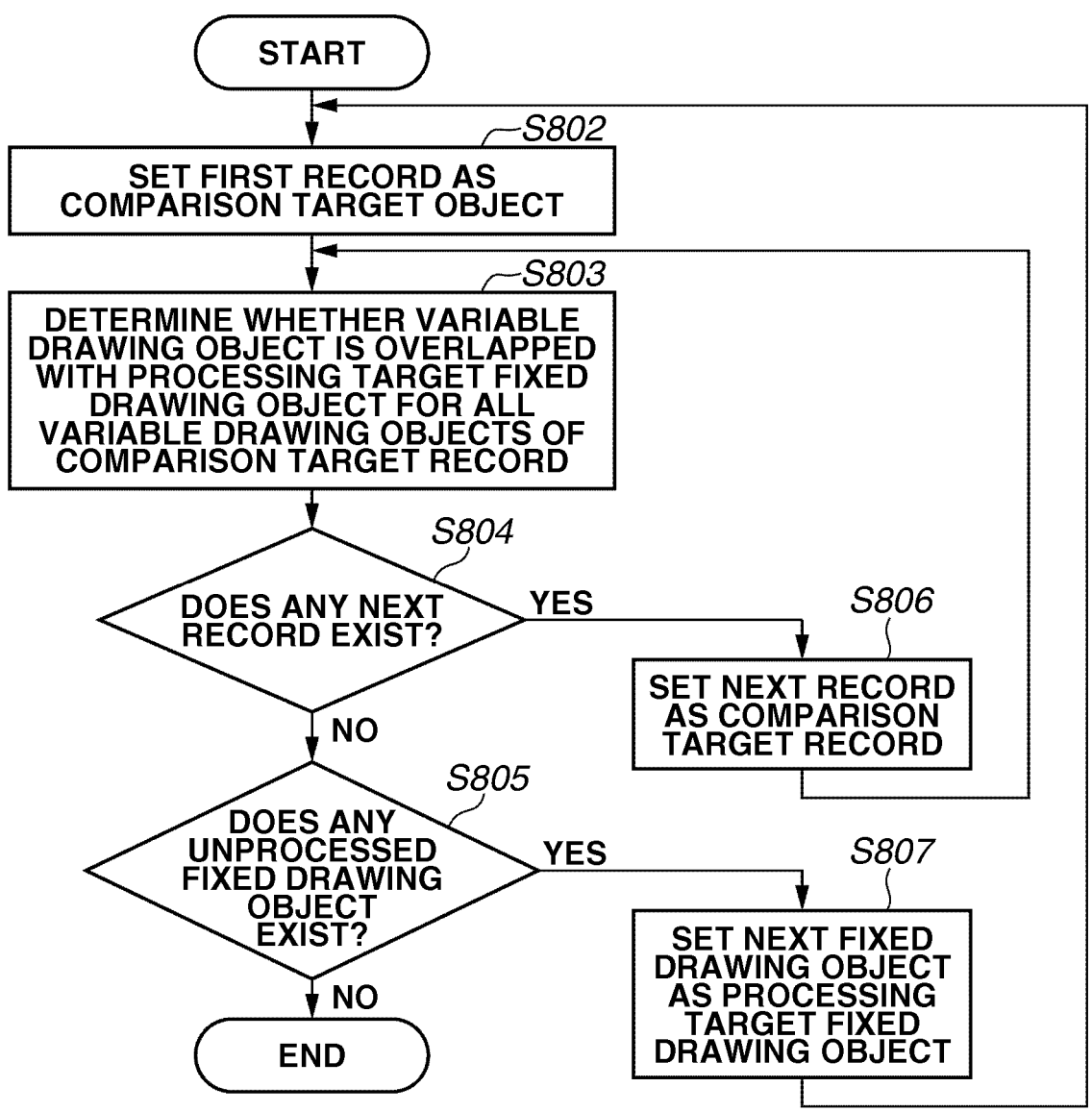
FIG. 9 is a flow chart illustrating an exemplary flow of processing for identifying a variable drawing object overlapping a fixed drawing object.

After identifying the fixed drawing object and the variable drawing object, it is necessary to determine which variable drawing object is overlapped on the fixed drawing object. FIG. 9 is a flow chart illustrating an example of processing for determining which variable drawing object is overlapped on the fixed drawing object. Referring to FIG. 9, in step S802, the print server 103 executes initialization for a subsequent loop.

More specifically, in step S802, the print server 103 sets the first record as the comparison target record.

In step S803, the print server 103 determines, in the comparison target record, whether any variable drawing object is overlapped on the processing target fixed drawing object for all the variable drawing objects included in the comparison target record. In the present exemplary embodiment, the overlapping status can be determined by two methods. Firstly, the overlapping status can be determined by using the circumscribed rectangle region of the object. Secondly, the overlapping status can be determined by using the drawing region of the object.

If the former method is used, the accuracy of determination is lower than that of a case where the latter is used. This is because the determination cannot be appropriately made in a case where the circumscribed rectangle regions are overlapped but the drawing regions are not overlapped.

On the other hand, if the latter method is used, it is necessary to process the processing target fixed drawing object and the determination target variable drawing object by RIP. Accordingly, the number of objects to be processed is greater than that the number of objects to be processed by the former method. However, if the latter method is used, a high determination accuracy can be achieved because the overlapping status in actual drawing can be determined. A user can previously designate in which region the determination is made.

Figure 10:
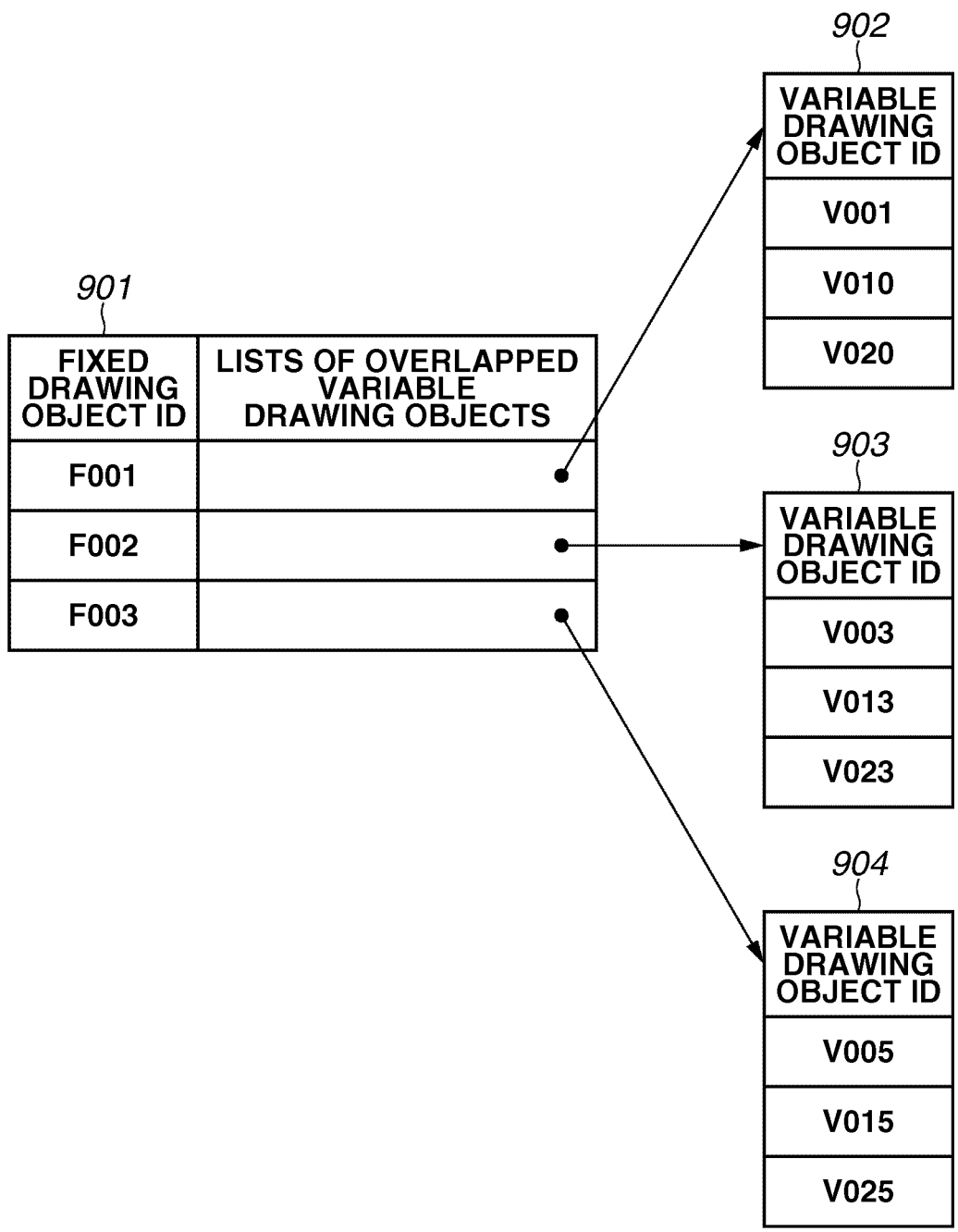
FIG. 10 illustrates an example of a table that manages a fixed drawing object and a variable drawing object that overlaps the fixed drawing object.

Every time a variable drawing object overlapping the processing target fixed drawing object is extracted, the print server 103 stores information for identifying the variable drawing object in a table illustrated in FIG. 10. Referring to FIG. 10, a table 901 manages a fixed drawing object and a variable drawing object that overlaps the fixed drawing object.

The table 901 includes an identification (ID) number for identifying a fixed drawing object and a pointer for identifying the table that stores a variable drawing object corresponding to the fixed drawing object. Each of tables 902 through 904 manages variable drawing objects. In the example illustrated in FIG. 10, the tables 902 through 904 store information on variable drawing objects that overlap fixed drawing objects F001 through F003, respectively.

In steps S804 and S805, the print server 103 determines whether to end the loop. More specifically, in step S804, the print server 103 determines whether any next record exists. If it is determined that a next record exists (YES in step S804), then the processing advances to step S806. On the other hand, if it is determined that no such next record exists (NO in step S804), then the processing advances to step S805.

In step S805, the print server 103 determines whether any unprocessed fixed drawing object exists. If it is determined that any unprocessed fixed drawing object exists (YES in step S805), then the processing advances to step S807. On the other hand, if it is determined that all the fixed drawing objects have been processed (NO in step S805), then the processing illustrated in FIG. 9 ends.

In steps S806 and S807, the print server 103 initializes the loop. More specifically, in step S806, the print server 103 processes the next record. In other words, in step S806, the print server 103 sets the next record as the comparison target record.

In step S807, the print server 103 processes a next fixed drawing object. More specifically, in step S807, the print server 103 sets the next fixed drawing object as the processing target fixed drawing object. In the above-described manner, the print server 103 determines the status of overlap between the fixed drawing object and the variable drawing object.

In step S505 (FIG. 5), the print server 103 calculates an evaluation value and determines whether to merge the fixed drawing object and the variable drawing object based on the calculated evaluation value as described above. In the evaluation in step S505, various evaluation functions for evaluating the degree of overlap between the fixed drawing object and the variable drawing object can be used. More specifically, an evaluation function illustrated in FIG. 11 can be used.

The evaluation function includes an expression for evaluating the degree of overlap between the fixed drawing object and the variable drawing object. More specifically, with the evaluation function, it can be evaluated whether the fixed drawing object and the variable drawing object are partially overlapped with each other or overlapped with each other in most regions thereof.

In the example illustrated in FIG. 11, a term of the expression "NonOverlappedArea" refers to a field of the fixed drawing object in which the variable drawing object is not overlapped on the fixed drawing object if the variable drawing object overlaps the fixed drawing object.

Figure 12:
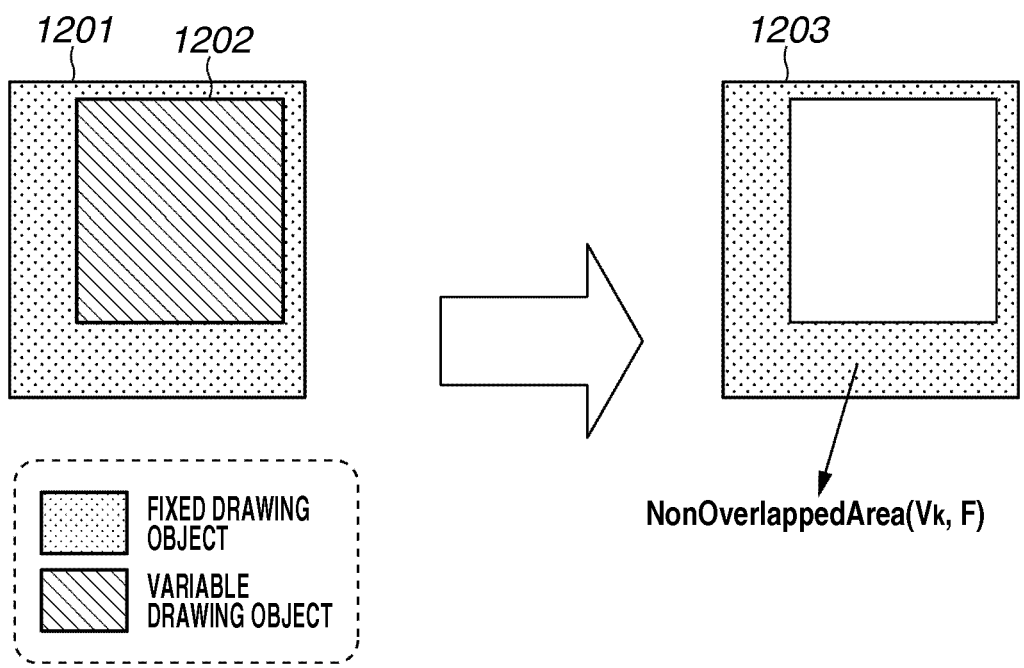
FIG. 12 illustrates an example of an overlap region.

FIG. 12 illustrates an example of an overlap region. In the example illustrated in FIG. 12, a region of a fixed drawing object 1201 in which a variable drawing object 1202 is not overlapped on the fixed drawing object 1201 is set as a NonOverlappedArea 1203. If an average of values calculated by normalizing the NonOverlappedArea by the total area of areas of the variable drawing objects is smaller than a predetermined threshold value, then the print server 103 determines that the fixed drawing object and the variable drawing object are to be merged.

The present exemplary embodiment uses the evaluation function illustrated in FIG. 11 for the following purposes.

In the present exemplary embodiment, as described above, the print server 103 merges the fixed drawing object and the variable drawing object in order to prevent overlap between the fixed drawing object and the variable drawing object. However, if a fixed drawing object and a variable drawing object overlapping the fixed drawing object are merged, the following problem may arise.

More specifically, in this case, the fixed drawing object, which is at first intended to be printed by offset printing, is actually printed by the digital printing machine 107. Accordingly, the fixed drawing object cannot be printed with as high an image quality as the quality of an image that otherwise may be achieved by offset printing.

In particular, suppose a case where a variable drawing object, which has a size smaller than that of a fixed drawing object, is overlapped on the fixed drawing object in only a partial region thereof. In this case, the fixed drawing object, whose size is large and is at first intended to be printed by offset printing, is entirely printed by the digital printing machine 107.

Figure 13:
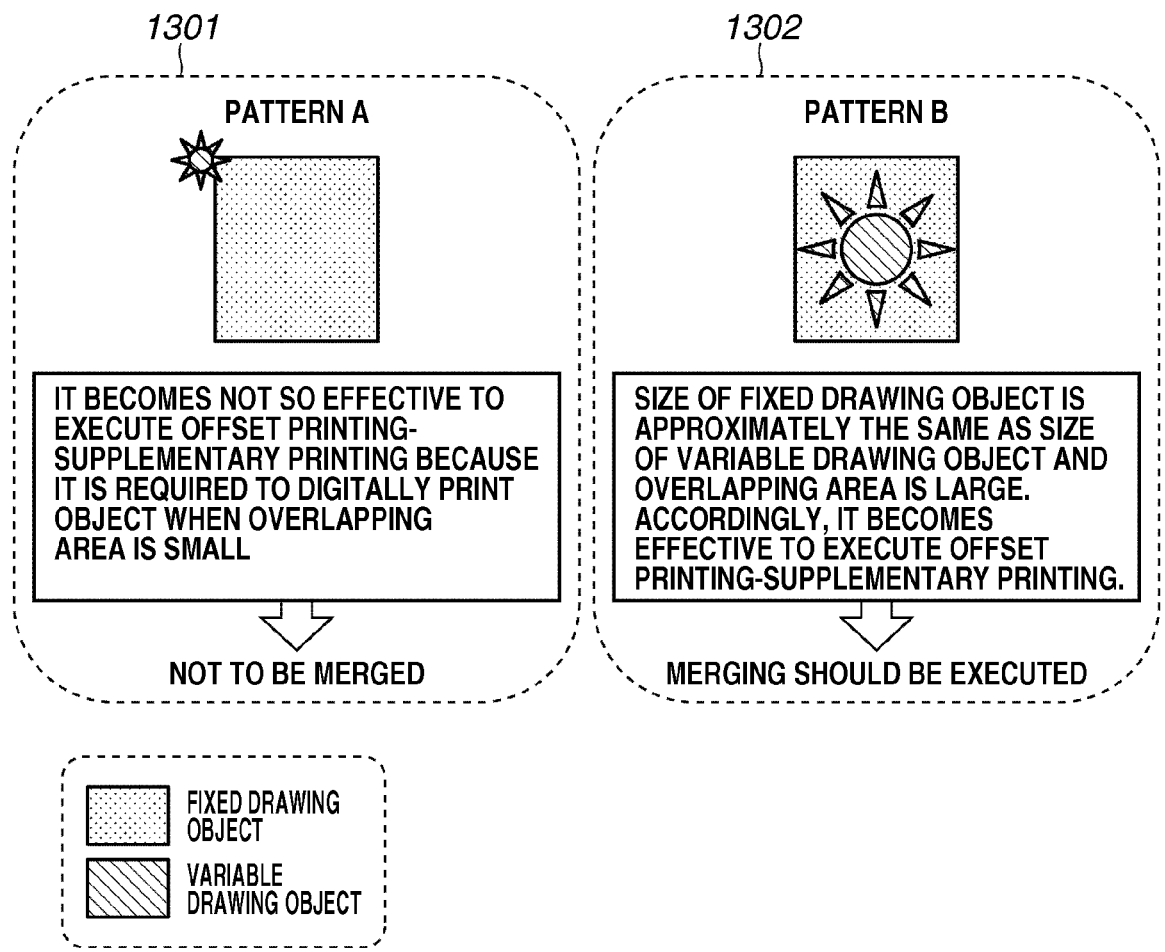
FIG. 13 illustrates an example of a criterion of determining whether to execute merging.

To paraphrase this, as illustrated in FIG. 13, a large fixed drawing object 1301, which is at first intended to be printed by offset printing, is actually and entirely printed by the digital printing machine 107. Accordingly, a resulting print product of the fixed drawing object cannot have as high an image quality as the quality of an image that can be achieved if it is printed by offset printing. Therefore, in this case, the print server 103 determines that the fixed drawing object and the variable drawing object should not be merged.

On the other hand, if the degree of image degradation that may occur by digital printing with the digital printing machine 107 is within an allowable range, the print server 103 can determine that the fixed drawing object and the variable drawing object are to be merged. More specifically, the case where merging of the fixed drawing object and the variable drawing object is available includes the following cases:

if the size of the fixed drawing object is small enough;

if the density of the color of the fixed drawing object is low enough; or if the possible image degradation is not easy to recognize because the fixed drawing object is drawn in a region of the sheet close to the edge of the sheet.

The evaluation function illustrated in FIG. 11 includes an expression for evaluation of a case where the fixed drawing object is small enough. More specifically, if the size of the fixed drawing object is relatively smaller than the size of the variable drawing object and if the fixed drawing object and the variable drawing object are overlapped with each other in a large region thereof, the problem that may occur due to merging of the variable drawing object and the fixed drawing object can be suppressed to a minimum.

Accordingly, in this case, the print server 103 determines that the fixed drawing object and the variable drawing object are to be merged. To paraphrase this, in a case 1302 illustrated in FIG. 13, the print server 103 determines that the fixed drawing object and the variable drawing object are to be merged.

For the evaluation function, the present exemplary embodiment is not limited to the evaluation function illustrated in FIG. 11. More specifically, instead of using the evaluation function illustrated in FIG. 11, it can be determined that the fixed drawing object and the variable drawing object are to be merged if the density of the color of the fixed drawing object is high and the density of the color of the variable drawing object that overlaps the fixed drawing object having the high color density is low.

FIG. 14 illustrates an example of an evaluation function used in this case. The evaluation function illustrated in FIG. 14 is used to execute determination in the above-described case where the density of the color of the fixed drawing object is low enough.

The lower the density of the color of the fixed drawing object is, the less the effect of digital printing that may cause image degradation becomes. Therefore, in this case, the print server 103 determines that the fixed drawing object and the variable drawing object are to be merged.

For the evaluation function used in step S505 illustrated in FIG. 5, either one of the above-described evaluation functions can be used. Alternatively, a combination of the above-described evaluation functions can be used by weighting thereof.

Returning to FIG. 5, in step S506, the print server 103 determines whether the evaluation value calculated by the above-described evaluation function is lower than a predetermined threshold value set by the user. If it is determined that the evaluation value calculated by the above-described evaluation function is lower than the predetermined threshold value set by the user (YES in step S506), then the processing advances to step S507.

In step S507, the print server 103 merges the fixed drawing object and the variable drawing object so that the fixed drawing object and the variable drawing object are not overlapped. By executing the above-described processing, the present exemplary embodiment can prevent the ink or the toner from the digital printing machine 107, which is provided to print the variable drawing object, from being overlapped on the offset ink, which is used in printing the fixed drawing object, while suppressing otherwise possible degradation of image quality to a minimum at the same time.

On the other hand, if it is determined that the evaluation value calculated by the above-described evaluation function is equal to or greater than the predetermined threshold value set by the user (NO in step S506), then the processing advances to step S508. In step S508, the print server 103 receives a user designation as to whether to unfill a part of the fixed drawing object.

Figure 15:
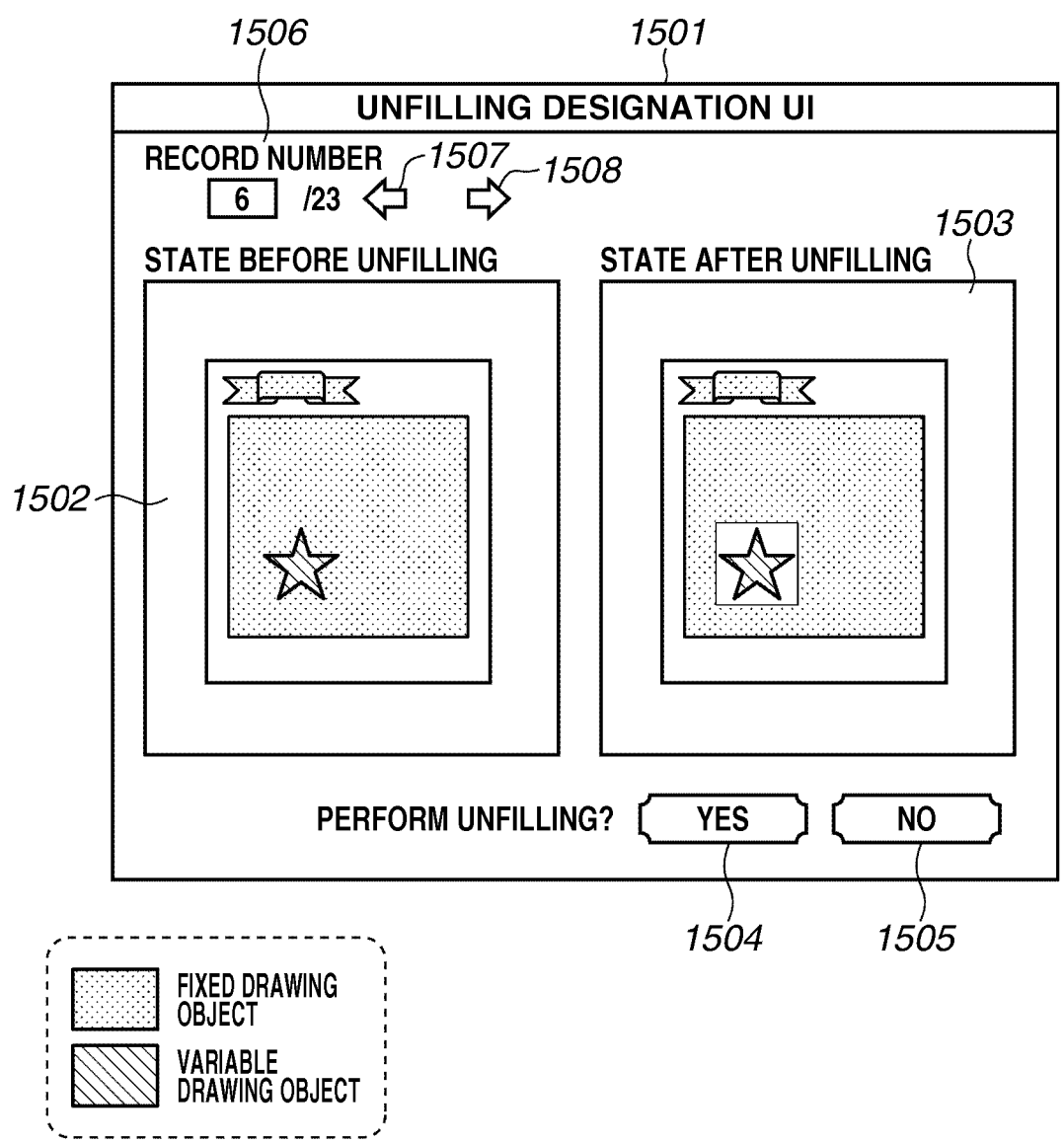
FIG. 15 illustrates an example of a user interface for executing a designation of unfilling.

FIG. 15 illustrates an example of a user interface presented to the user on the display 205 of the print server 103. In the example illustrated in FIG. 15, a dialog 1501 for allowing the user to designate whether to unfill a part of the fixed drawing object is displayed on the user interface. In addition, a preview image 1502, which is a preview image of print data before unfilling a part of the fixed drawing object, is displayed on the user interface. Furthermore, a preview image 1503, which is a preview image of print data displayed after unfilling a part of the fixed drawing object, is displayed on the user interface.

The user can input an instruction for unfilling a part of the fixed drawing object to the print server 103 by operating a button 1504. Furthermore, by operating a button 1505, the user can input an instruction for not unfilling a part of the fixed drawing object to the print server 103.

A text box 1506 indicates a record number of a record whose preview is to be displayed. A button 1507 can be operated by the user to input an instruction for returning the record preview to a preview of a record previous to the current record. A button 1508 can be operated by the user to input an instruction for shifting the record preview to a preview of a record next to the current record.

The print server 103 displays the preview image 1503 to the user and receives a user instruction as to whether to unfill a part of the fixed drawing object. If it is detected that the button 1507 has been pressed, then the print server 103 changes the content of the text box 1506 to the record number of the previous record and displays the preview image of the previous record. On the other hand, if it is detected that the button 1508 has been pressed, then the print server 103 changes the content of the text box 1506 to the record number of the next record and displays the preview image of the next record.

Furthermore, if it is detected that the button 1504 has been pressed by the user, then the print server 103 unfills a part of the processing target fixed drawing object. On the other hand, if it is detected that the button 1505 has been pressed, the print server 103 does not unfill a part of the processing target fixed drawing object.

In the above-described first exemplary embodiment, the processing in the flow chart illustrated in FIG. 5 is executed by the print server 103. In a second exemplary embodiment of the present invention, a part of the processing illustrated in FIG. 5 is executed by the client PC 102 instead of the print server 103.

By assigning a part of the processing illustrated in FIG. 5 to the client PC 102, the processing load on the print server 103 can be reduced. Accordingly, the print processing can be completed in a shorter processing time.

Figure 16:
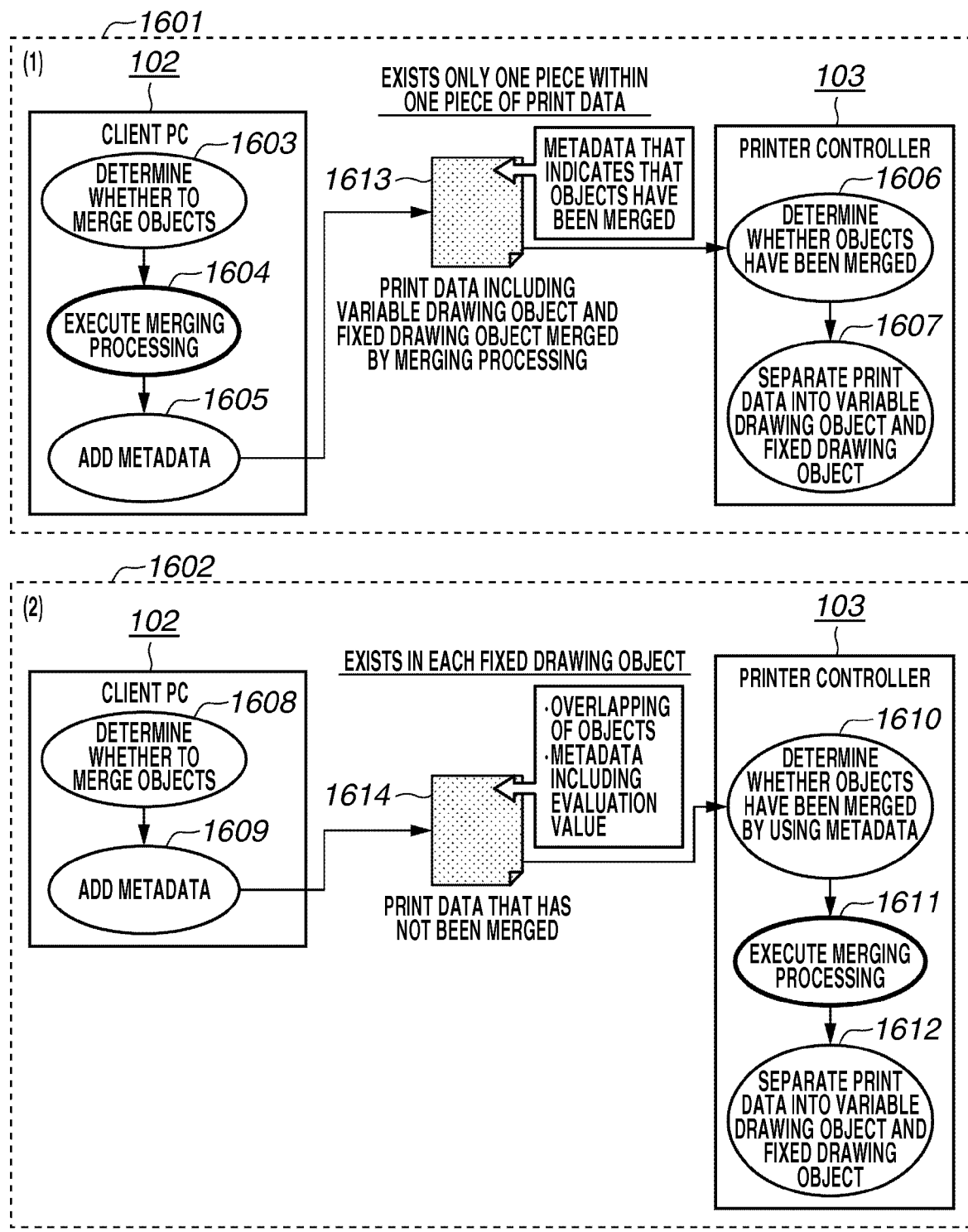
FIG. 16 illustrates an example of processing assigned to and executed by each of a client PC and a print server.

Two different methods can implement the present exemplary embodiment according to which processing of the processing illustrated in FIG. 5 is assigned to the client PC 102. FIG. 16 illustrates an example of processing executed by each of the two methods.

<Method 1: Method in which the Client PC 102 Executes the Merging>

If a first method (hereinafter simply referred to as a "method 1") 1601 is used, in an operation 1603, the client PC 102 determines whether to merge the fixed drawing object and the variable drawing object. In an operation 1604, the client PC 102 executes the actual merging of the fixed drawing object and the variable drawing object.

In an operation 1605, the client PC 102 adds metadata to the print data. More specifically, the metadata added to the print data in the operation 1605 indicates information describing that the objects have been "merged" ("generated").

Figure 17:
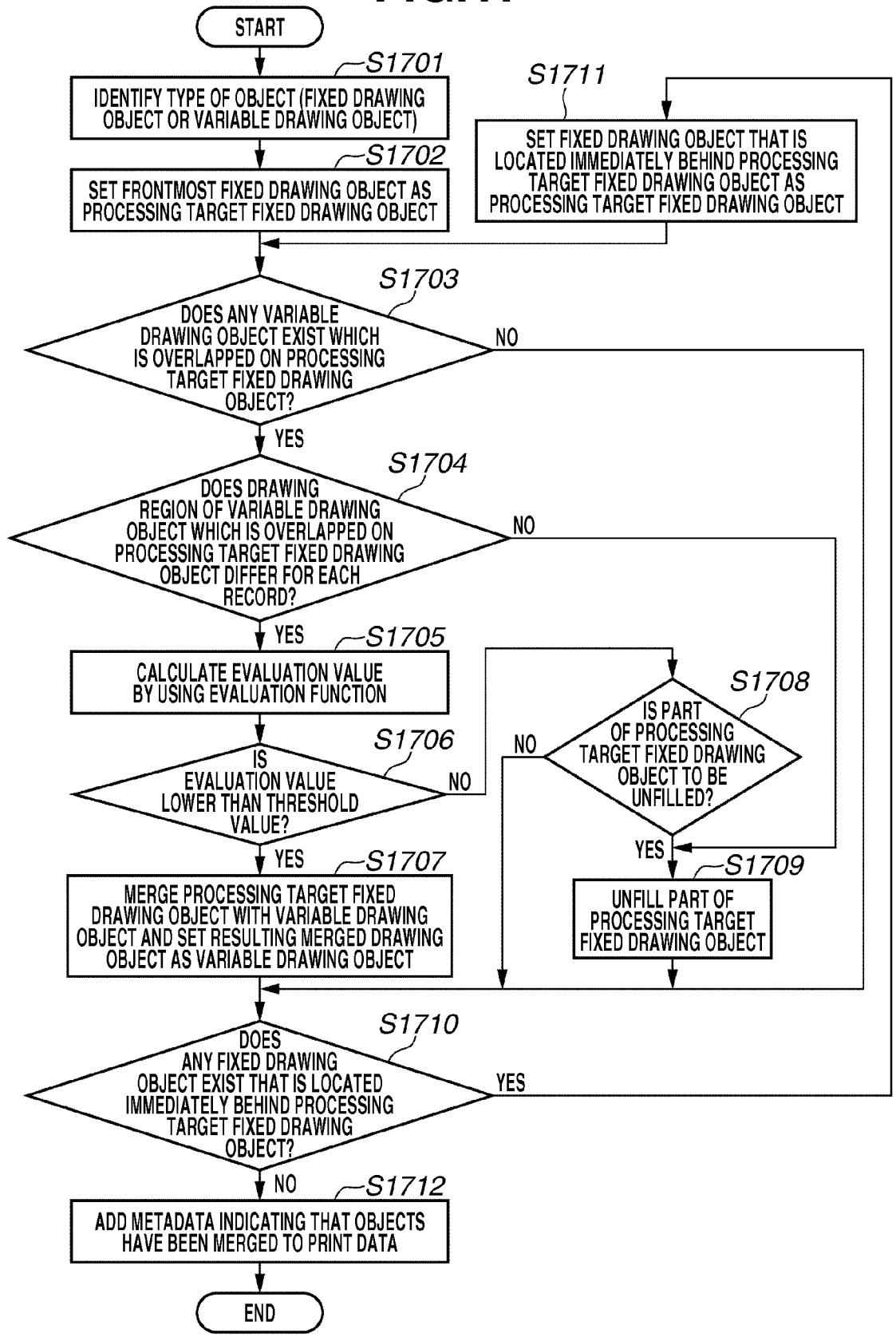
FIG. 17 is a flow chart illustrating an example of merging executed by a client PC.

FIG. 17 is a flow chart illustrating an example of the processing executed by the client PC 102. In the example illustrated in FIG. 17, processing in steps S1701 through S1711 is similar to the processing in steps S501 through S511 illustrated in FIG. 5. Accordingly, the detailed description thereof will not be repeated here.

In step S1712, the client PC 102 adds the metadata, which indicates that the fixed drawing object and the variable drawing object have been merged, to the print data. In an operation 1606 (FIG. 16), the print server 103 identifies the metadata which indicates that the fixed drawing object and the variable drawing object have been merged.

To paraphrase this, in the operation 1606, the print server 103 determines whether the fixed drawing object and the variable drawing object have been merged. If it is determined that the fixed drawing object and the variable drawing object have been merged, then the processing advances to an operation 1607. In the operation 1607, the print server 103 separates the fixed drawing object and the variable drawing object according to the content of the print data.

On the other hand, if it is determined that the fixed drawing object and the variable drawing object have not been merged, then the print server 103 executes processing similar to that in the first exemplary embodiment.

<Method 2: Method in which the Client PC 102 Executes Determination as to Whether to Merge Objects and the Print Server 103 Executes Merging>

If a second method (hereinafter simply referred to as a "method 2") 1602 is used, in an operation 1608, the client PC 102 determines whether to merge the fixed drawing object and the variable drawing object but does not execute the merging itself. In an operation 1609, instead of executing merging, the client PC 102 adds a result of the determination as to whether to merge the objects (hereinafter simply referred to as an "object merging execution determination result") to the print data as metadata. Furthermore, the client PC 102 transmits the print data, to which the object merging execution determination result has been added, to the print server 103.

In an operation 1611 illustrated in FIG. 16, the print server 103 merges the fixed drawing object and the variable drawing object according to the object merging execution determination result, which has been added to the print data. In an operation 1612, the print server 103 separates the fixed drawing object and the variable drawing object. Furthermore, the print server 103 executes the offset printing-supplementary printing.

Figure 18:
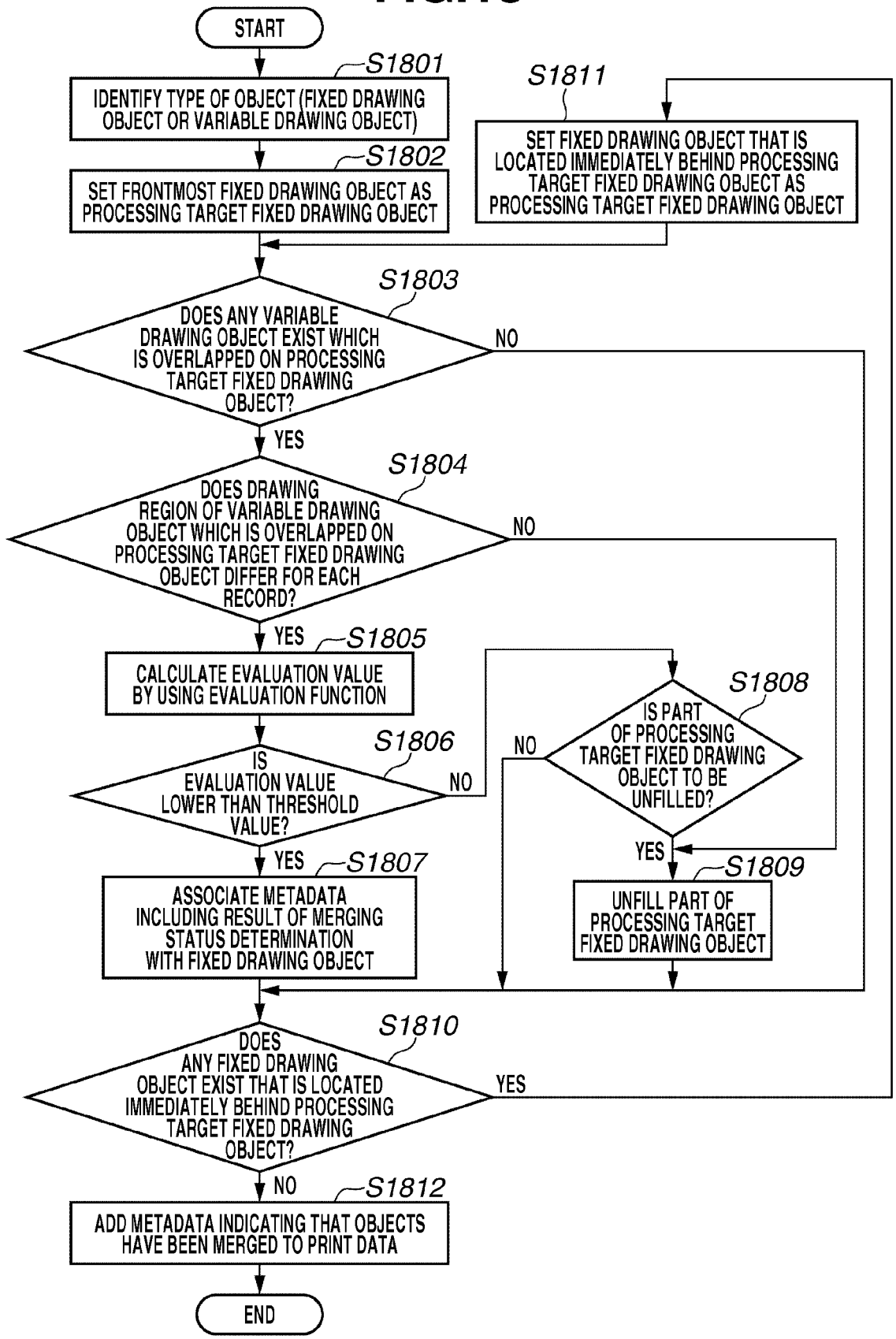
FIG. 18 is a flow chart of processing executed by a client PC when a determination of whether to merge objects only is executed by the client PC.

FIG. 18 is a flow chart illustrating an example of the processing executed by the client PC 102. In the example illustrated in FIG. 18, processing in steps S1801 through S1806 is similar to the processing in steps S501 through S506 illustrated in FIG. 5. In addition, processing in steps S1808 through S1811 is similar to the processing in steps S508 through S511 illustrated in FIG. 5. Accordingly, the detailed description thereof will not be repeated here.

Referring to FIG. 18, in step S1807, the client PC 102 associates the metadata including the object merging execution determination result with the fixed drawing object. In step S1812, the client PC 102 adds the object merging execution determination result to the print data.

In the method 2, the metadata to be associated with the fixed drawing object includes the following information:

(1) a list of indices (or IDs) of the variable drawing objects which overlap the fixed drawing object;
(2) the evaluation value calculated by the evaluation function;
(3) the type of the evaluation function used in calculating the evaluation value; and
(4) the definition of the area of the object used in calculating the evaluation value (i.e., the area of the object can be defined by a circumscribed rectangle or the number of drawing pixels).

More specifically, the metadata to be associated with the fixed drawing object stores information necessary for generating the variable drawing object by the print server 103 by combining the fixed drawing object and the variable drawing object. To begin with, the print server 103 determines a threshold value of the evaluation value based on the above-described information (3) and (4) for each fixed drawing object. In addition, the print server 103 compares the determined threshold value with the information (2).

The print server 103 determines whether to merge the fixed drawing object and the variable drawing object based on the result of the comparison. If it is determined that the fixed drawing object and the variable drawing object are to be merged, the print server 103 merges the processing target fixed drawing object and the variable drawing object which overlaps the fixed drawing object by using the information (1) described above.

As described above, in the method 1, the client PC 102 executes the determination as to whether to merge the objects as well as the merging of the objects itself. Accordingly, of the two methods 1 and 2 described above, the method 1 is useful, compared with the method 2, in the point that the processing load on the print server 103 is lower and thus the printing can be completed in a relatively short time.

However, in the method 1, after the merging is executed, the fixed drawing objects are copied and merged in the number equivalent to the number of the variable drawing objects when it is originally intended only one fixed drawing object exists in one piece of print data. Accordingly, if the method 1 is used, the size of the print data is larger than that in the method 2.

If the size of the print data is large, the printing speed may be reduced if the speed of communication in the communication path for transmitting the print data is low. Accordingly, if the speed of data transmission via the communication path is high enough, the client PC 102 can select the method 1 while if the speed of data transmission via the communication path is low, the client PC 102 can select the method 2.

The present invention can also be achieved by providing a system or an apparatus with a storage medium storing a software program (program code) that can implement the functions of the embodiments and by reading and executing the program code stored in the storage medium with a computer of the system or the apparatus (a CPU or a micro processing unit (MPU)).

According to each exemplary embodiment of the present invention, overlapping of an ink from the digital printing machine, which is used in printing the variable drawing object, on an offset ink, which is used in printing the fixed drawing object, can be prevented while preventing otherwise possible degradation of image quality at the same time.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-278690 filed Dec. 8, 2009, which is hereby incorporated by reference herein in its entirety.

What is claimed is:

1. An information processing apparatus comprising:
a determination unit configured to, if a first variable drawing object, which is included in print data including a processing target fixed drawing object, overlaps the processing target fixed drawing object, determine whether a quality of a print product produced by printing a second variable drawing object, which is generated by combining the fixed drawing object and the first variable drawing object, by using a digital printing machine is within an allowable range when compared with a quality of a print product achieved when the fixed drawing object is printed by an offset printing machine; and
an object generation unit configured to, if it is determined by the determination unit that the quality of the print product produced by printing the second variable drawing object by using the digital printing machine is within the allowable range, generate the second variable drawing object by combining the fixed drawing object and the first variable drawing object,
wherein the determination unit is configured to determine whether the quality of the print product produced by printing the second variable drawing object by using the digital printing machine is within the allowable range when compared with the quality of the print product achieved when the fixed drawing object is printed by the offset printing machine based on a degree of overlap between the first variable drawing object and the fixed drawing object.

2. The information processing apparatus according to claim 1, wherein the determination unit is configured to determine whether the quality of the print product produced by printing the second variable drawing object by using the digital printing machine is within the allowable range when compared with the quality of the print product achieved when the fixed drawing object is printed by the offset printing machine based on a density of a color of the fixed drawing object.

3. The information processing apparatus according to claim 1, further comprising an overlap determination unit configured to determine whether any variable drawing object that overlaps the fixed drawing object exists based on a region of the processing target fixed drawing object included in the print data and a region of a plurality of variable drawing objects included in the print data,
wherein the determination unit is configured to, if it is determined by the overlap determination unit that a variable drawing object that overlaps the fixed drawing object exists, determine whether the quality of the print product produced by printing the second variable drawing object by using the digital printing machine is within the allowable range when compared with the quality of the print product achieved when the fixed drawing object is printed by the offset printing machine.

4. The information processing apparatus according to claim 3, wherein the determination unit is configured to, if it is determined by the overlap determination unit that a variable drawing object that overlaps the fixed drawing object exists and if a drawing region of the variable drawing object that overlaps the fixed drawing object differs record by record, determine whether the quality of the print product produced by printing the second variable drawing object by using the digital printing machine is within the allowable range when compared with the quality of the print product achieved when the fixed drawing object is printed by the offset printing machine.

5. The information processing apparatus according to claim 1, further comprising an unfilling unit configured to, if it is determined by the determination unit that the quality of the print product produced by printing the second variable drawing object by using the digital printing machine is not within the allowable range, execute unfilling of a part of the fixed drawing object in a shape of a circumscribed rectangle region of the first variable drawing object that overlaps the fixed drawing object.

6. The information processing apparatus according to claim 5, wherein the unfilling unit is configured to, if it is determined by the determination unit that the quality of the print product produced by printing the second variable drawing object by using the digital printing machine is not within the allowable range and if a user has input an instruction for executing unfilling via a user interface, execute unfilling of a part of the fixed drawing object in the shape of the circumscribed rectangle region of the first variable drawing object that overlaps the fixed drawing object.

7. The information processing apparatus according to claim 1, further comprising an unfilling unit configured to, if a drawing region of the first variable drawing object that overlaps the fixed drawing object does not differ record by record, execute unfilling in a drawing region of the fixed drawing object.

8. An information processing apparatus comprising:
a determination unit configured to, if a first variable drawing object, which is included in print data including a processing target fixed drawing object, overlaps the processing target fixed drawing object, determine whether a quality of a print product produced by printing a second variable drawing object, which is generated by combining the fixed drawing object and the first variable drawing object, by using a digital printing machine is within an allowable range when compared with a quality of a print product achieved when the fixed drawing object is printed by an offset printing machine;
an object generation unit configured to, if it is determined by the determination unit that the quality of the print product produced by printing the second variable drawing object by using the digital printing machine is within the allowable range, generate the second variable drawing object by combining the fixed drawing object and the first variable drawing object; and
an addition unit configured, if the second variable drawing object has been generated by the object generation unit, to add data indicating that the second variable drawing object has been already generated to the print data,
wherein the determination unit is configured to determine whether the quality of the print product produced by printing the second variable drawing object by using the digital printing machine is within the allowable range when compared with the quality of the print product achieved when the fixed drawing object is printed by the offset printing machine based on a degree of overlap between the first variable drawing object and the fixed drawing object.

9. An information processing apparatus comprising:
a determination unit configured to, if a first variable drawing object, which is included in print data including a processing target fixed drawing object, overlaps the processing target fixed drawing object, determine whether a quality of a print product produced by printing a second variable drawing object, which is generated by combining the fixed drawing object and the first variable drawing object, by using a digital printing machine is within an allowable range when compared with a quality of a print product achieved when the fixed drawing object is printed by an offset printing machine; and an association unit configured to, if it is determined by the determination unit that the quality of the print product produced by printing the second variable drawing object by using the digital printing machine is within the allowable range, associate the fixed drawing object with data for generating the second variable drawing object by combining the fixed drawing object and the first variable drawing object, wherein the determination unit is configured to determine whether the quality of the print product produced by printing the second variable drawing object by using the digital printing machine is within the allowable range when compared with the quality of the print product achieved when the fixed drawing object is printed by the offset printing machine based on a degree of overlap between the first variable drawing object and the fixed drawing object.

10. A method executed by an information processing apparatus, the method comprising:

determining, if a first variable drawing object, which is included in print data including a processing target fixed drawing object, overlaps the processing target fixed drawing object, whether a quality of a print product produced by printing a second variable drawing object, which is generated by combining the fixed drawing object and the first variable drawing object, by using a digital printing machine is within an allowable range when compared with a quality of a print product achieved when the fixed drawing object is printed by an offset printing machine; and generating, if it is determined that the quality of the print product produced by printing the second variable drawing object by using the digital printing machine is within the allowable range, the second variable drawing object by combining the fixed drawing object and the first variable drawing object, wherein the determining step determines whether the quality of the print product produced by printing the second variable drawing object by using the digital printing machine is within the allowable range when compared with the quality of the print product achieved when the fixed drawing object is printed by the offset printing machine based on a degree of overlap between the first variable drawing object and the fixed drawing object.

11. A method executed by an information processing apparatus, the method comprising:

determining, if a first variable drawing object, which is included in print data including a processing target fixed drawing object, overlaps the processing target fixed drawing object, whether a quality of a print product produced by printing a second variable drawing object, which is generated by combining the fixed drawing object and the first variable drawing object, by using a digital printing machine is within an allowable range when compared with a quality of a print product achieved when the fixed drawing object is printed by an offset printing machine;

generating, if it is determined that the quality of the print product produced by printing the second variable drawing object by using the digital printing machine is within the allowable range, the second variable drawing object by combining the fixed drawing object and the first variable drawing object; and adding, if the second variable drawing object has been generated, data indicating that the second variable drawing object has been already generated to the print data, wherein the determining step determines whether the quality of the print product produced by printing the second variable drawing object by using the digital printing machine is within the allowable range when compared with the quality of the print product achieved when the fixed drawing object is printed by the offset printing machine based on a degree of overlap between the first variable drawing object and the fixed drawing object.

12. A method executed by an information processing apparatus, the method comprising:

determining, if a first variable drawing object, which is included in print data including a processing target fixed drawing object, overlaps the processing target fixed drawing object, whether a quality of a print product produced by printing a second variable drawing object, which is generated by combining the fixed drawing object and the first variable drawing object, by using a digital printing machine is within an allowable range when compared with a quality of a print product achieved when the fixed drawing object is printed by an offset printing machine; and associating, if it is determined that the quality of the print product produced by printing the second variable drawing object by using the digital printing machine is within the allowable range, the fixed drawing object with data for generating the second variable drawing object by combining the fixed drawing object and the first variable drawing object, wherein the determining step determines whether the quality of the print product produced by printing the second variable drawing object by using the digital printing machine is within the allowable range when compared with the quality of the print product achieved when the fixed drawing object is printed by the offset printing machine based on a degree of overlap between the first variable drawing object and the fixed drawing object.

13. A non-transitory computer-readable storage medium storing computer-executable instructions which, when executed by a computer, cause the computer to function as an information processing apparatus comprising:

a determination unit configured to, if a first variable drawing object, which is included in print data including a processing target fixed drawing object, overlaps the processing target fixed drawing object, determine whether a quality of a print product produced by printing a second variable drawing object, which is generated by combining the fixed drawing object and the first variable drawing object, by using a digital printing machine is within an allowable range when compared with a quality of a print product achieved when the fixed drawing object is printed by an offset printing machine; and an object generation unit configured to, if it is determined by the determination unit that the quality of the print product produced by printing the second variable drawing object by using the digital printing machine is within the allowable range, generate the second variable drawing object by combining the fixed drawing object and the first variable drawing object, wherein the determination unit is configured to determine whether the quality of the print product produced by printing the second variable drawing object by using the digital printing machine is within the allowable range when compared with the quality of the print product achieved when the fixed drawing object is printed by the offset printing machine based on a degree of overlap between the first variable drawing object and the fixed drawing object.

14. A non-transitory computer-readable storage medium storing computer-executable instructions which, when executed by a computer, cause the computer to function as an information processing apparatus comprising:
- a determination unit configured to, if a first variable drawing object, which is included in print data including a processing target fixed drawing object, overlaps the processing target fixed drawing object, determine whether a quality of a print product produced by printing a second variable drawing object, which is generated by combining the fixed drawing object and the first variable drawing object, by using a digital printing machine is within an allowable range when compared with a quality of a print product achieved when the fixed drawing object is printed by an offset printing machine;
- an object generation unit configured to, if it is determined by the determination unit that the quality of the print product produced by printing the second variable drawing object by using the digital printing machine is within the allowable range, generate the second variable drawing object by combining the fixed drawing object and the first variable drawing object; and
- an addition unit configured to, if the second variable drawing object has been generated by the object generation unit, add data indicating that the second variable drawing object has been already generated to the print data,
- wherein the determination unit is configured to determine whether the quality of the print product produced by printing the second variable drawing object by using the digital printing machine is within the allowable range when compared with the quality of the print product achieved when the fixed drawing object is printed by the offset printing machine based on a degree of overlap between the first variable drawing object and the fixed drawing object.

15. A non-transitory computer-readable storage medium storing computer-executable instructions which, when executed by a computer, cause the computer to function as an information processing apparatus comprising:
- a determination unit configured to, if a first variable drawing object, which is included in print data including a processing target fixed drawing object, overlaps the processing target fixed drawing object, determine whether a quality of a print product produced by printing a second variable drawing object, which is generated by combining the fixed drawing object and the first variable drawing object, by using a digital printing machine is within an allowable range when compared with a quality of a print product achieved when the fixed drawing object is printed by an offset printing machine; and
- an association unit configured to, if it is determined by the determination unit that the quality of the print product produced by printing the second variable drawing object by using the digital printing machine is within the allowable range, associate the fixed drawing object with data for generating the second variable drawing object by combining the fixed drawing object and the first variable drawing object,
- wherein the determination unit is configured to determine whether the quality of the print product produced by printing the second variable drawing object by using the digital printing machine is within the allowable range when compared with the quality of the print product achieved when the fixed drawing object is printed by the offset printing machine based on a degree of overlap between the first variable drawing object and the fixed drawing object.

* * * * *